US012695639B2

(12) United States Patent
    Faulkner

(10) Patent No.:    US 12,695,639 B2
(45) **Date of Patent:       *Jul. 28, 2026**

(54) DYNAMIC CURATION OF SEQUENCE EVENTS FOR COMMUNICATION SESSIONS

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

This patent is subject to a terminal disclaimer.

(21) Appl. No.: 18/632,113

(22) Filed: Apr. 10, 2024

(65) Prior Publication Data

US 2024/0259223 A1     Aug. 1, 2024

Related U.S. Application Data

(63) Continuation of application No. 16/215,387, filed on Dec. 10, 2018, now Pat. No. 11,985,000.

(51) Int. Cl.
    *H04L 12/18*      (2006.01)
    *G06F 21/62*      (2013.01)
    *G06Q 10/10*      (2023.01)
    *H04L 9/40*       (2022.01)
    *H04L 51/04*      (2022.01)
    *H04N 7/15*       (2006.01)
(52) U.S. Cl.
    CPC ...... *H04L 12/1827* (2013.01); *G06F 21/6218* (2013.01); *G06Q 10/10* (2013.01); *H04L 12/1822* (2013.01); *H04L 63/104* (2013.01);

*H04L 63/105* (2013.01); *H04N 7/155* (2013.01); *H04L 51/04* (2013.01)

(58) Field of Classification Search
    CPC . G06F 21/6218; G06Q 10/10; H04L 12/1822; H04L 12/1827; H04L 51/04; H04L 63/104; H04L 63/105; H04N 7/155
    See application file for complete search history.

(56) References Cited

PUBLICATIONS

Invitation pursuant to Rule 137(4) EPC and Article 94(3) EPC, Received for European Application No. 19828014.1, mailed on Jan. 23, 2024, 2 pages.
Communication pursuant to Article 94(3) EPC, Received for European Application No. 19828014.1, mailed on Mar. 31, 2025, 4 pages.

*Primary Examiner* — Thomas J Dailey
(74) *Attorney, Agent, or Firm* — Scott Y. Shigeta; Newport IP, LLC

(57)            ABSTRACT

The techniques disclosed herein provide dynamic curation of sequence events for communication sessions. A system can utilize smart filtering techniques to generate and select sequence events that are designed to optimize user engagement. The system can collect contextual data associated with a communication session, which can be in the form of a private chat session, a multi-user editing session, a group meeting, a live broadcast, etc. The system can utilize the contextual data, and other input data defining user activity, to customize sequence events defining contextually-relevant user interface (UI) layouts, volume levels, camera angles, special effects, and other parameters controlling aspects of the communication session.

15 Claims, 21 Drawing Sheets

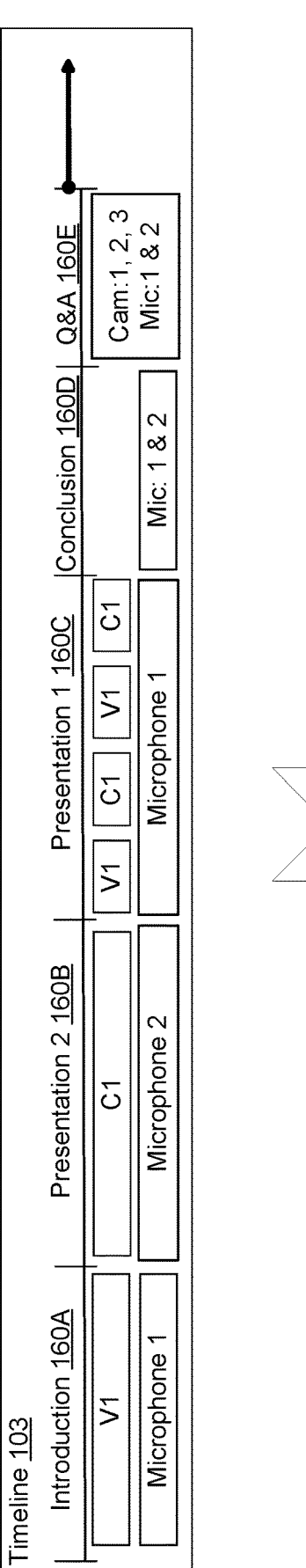
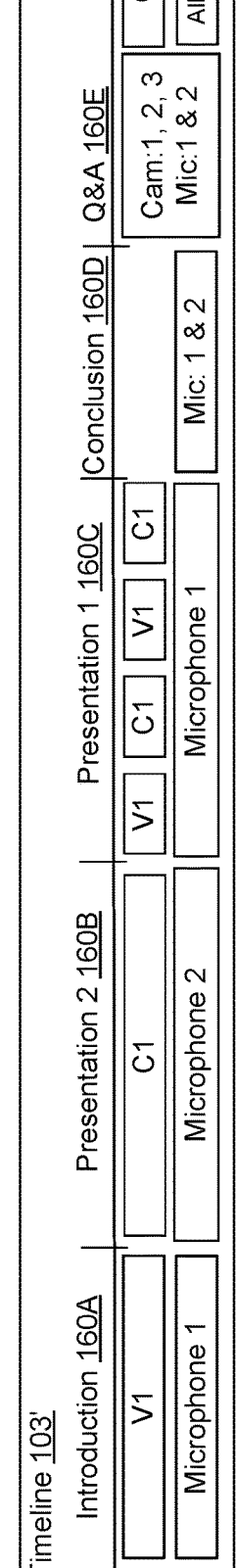
*FIG. 5C*

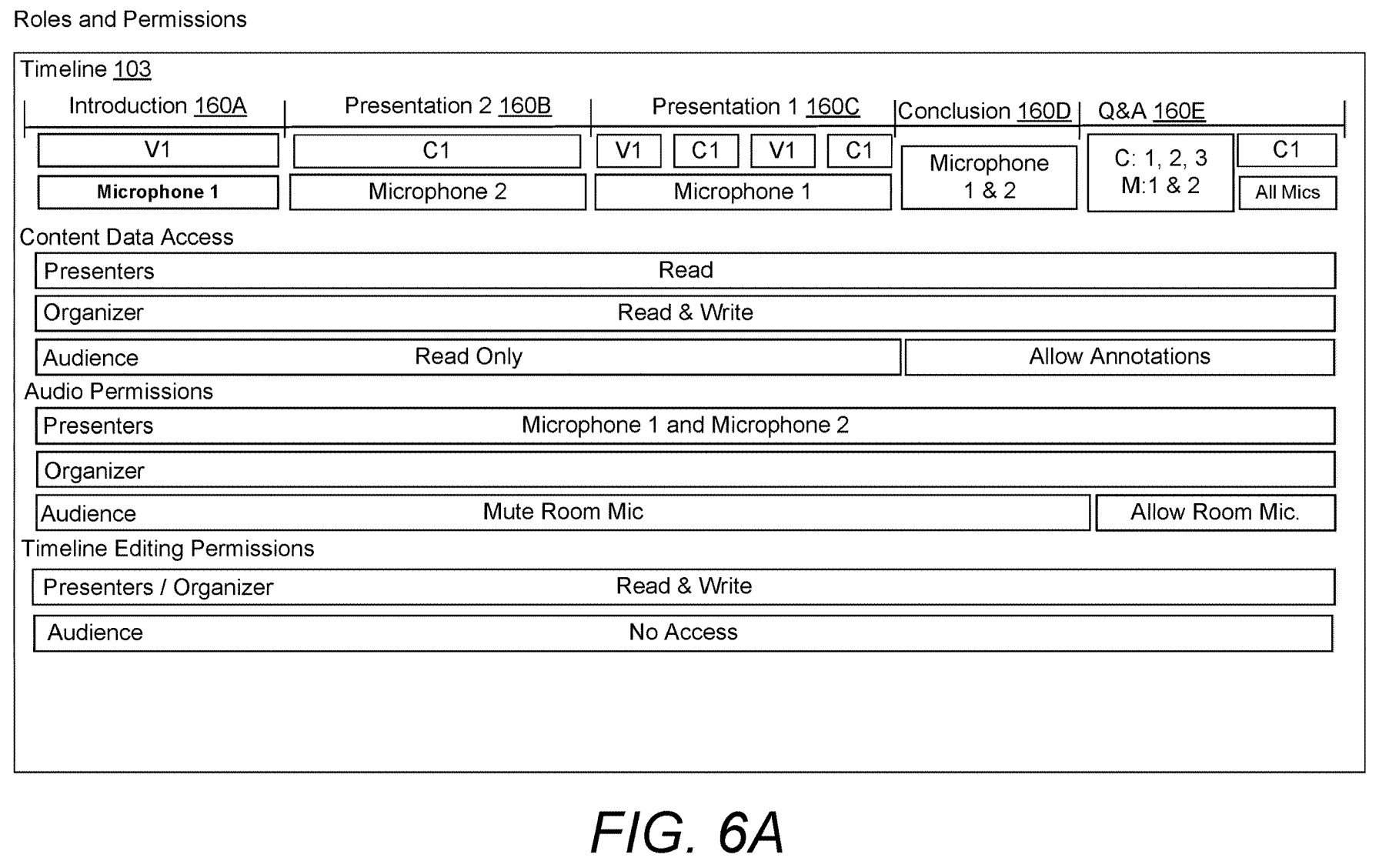

Roles and Permissions

Timeline 103

| Introduction 160A | Presentation 2 160B | Presentation 1 160C | Conclusion 160D | Q&A 160E |
|---|---|---|---|---|
| V1 | C1 | V1 \| C1 \| V1 \| C1 | | C1 |
| Microphone 1 | Microphone 2 | Microphone 1 | Microphone 1 & 2 | C: 1, 2, 3 M:1 & 2 | All Mics |

Content Data Access

| Presenters | Read |
|---|---|
| Organizer | Read & Write |
| Audience | Read Only | Allow Annotations |

Audio Permissions

| Presenters | Microphone 1 and Microphone 2 |
|---|---|
| Organizer | Mute Room Mic | Allow Room Mic. |
| Audience | |

Timeline Editing Permissions

| Presenters / Organizer | Read & Write |
|---|---|
| Audience | No Access |

*FIG. 6A*

Timeline 103

| Introduction 160A | Presentation 2 160B | Presentation 1 160C | | Conclusion 160D | Q&A 160E |
|---|---|---|---|---|---|
| V1 | C1 | V1/C1 | V1 V2 C1 | | C: 1, 2, 3 |
| | | | | | M:1 & 2 |
| Microphone 1 | Microphone 2 | Microphone 1 | | Microphone 1 & 2 | All Mics |

Content Data Access

| | |
|---|---|
| Presenters | Read & Write |
| Organizer | Read & Write |
| Audience | Read Only | Allow Annotations |

Audio Permissions

| | |
|---|---|
| Presenters | Microphone 1 and Microphone 2 |
| Organizer | Microphone 1 and Microphone 2 |
| Audience | Mute Room Mic | Allow Room Mic. |

Timeline Editing Permissions

| | |
|---|---|
| Presenters / Organizer | Read & Write |
| Audience | No Access |

*FIG. 6B*

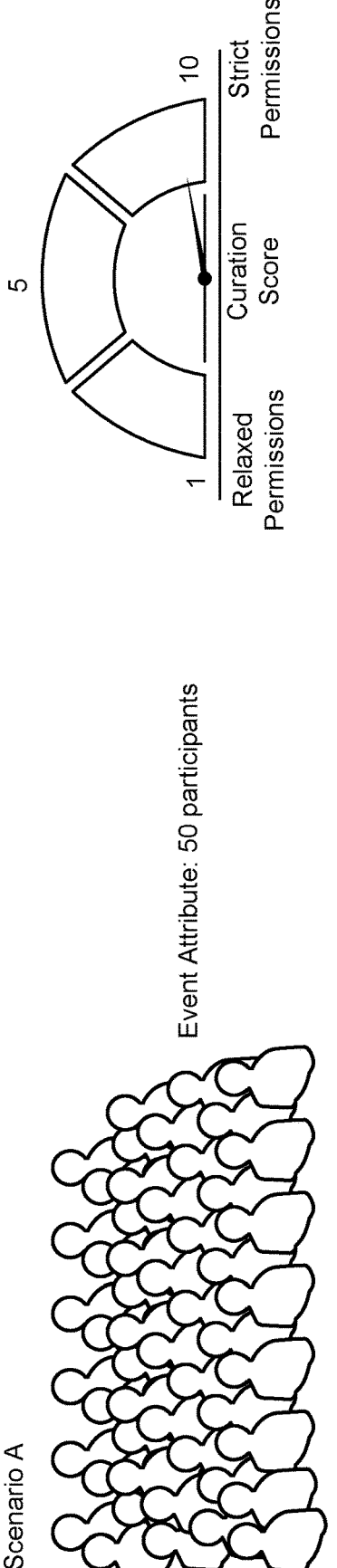
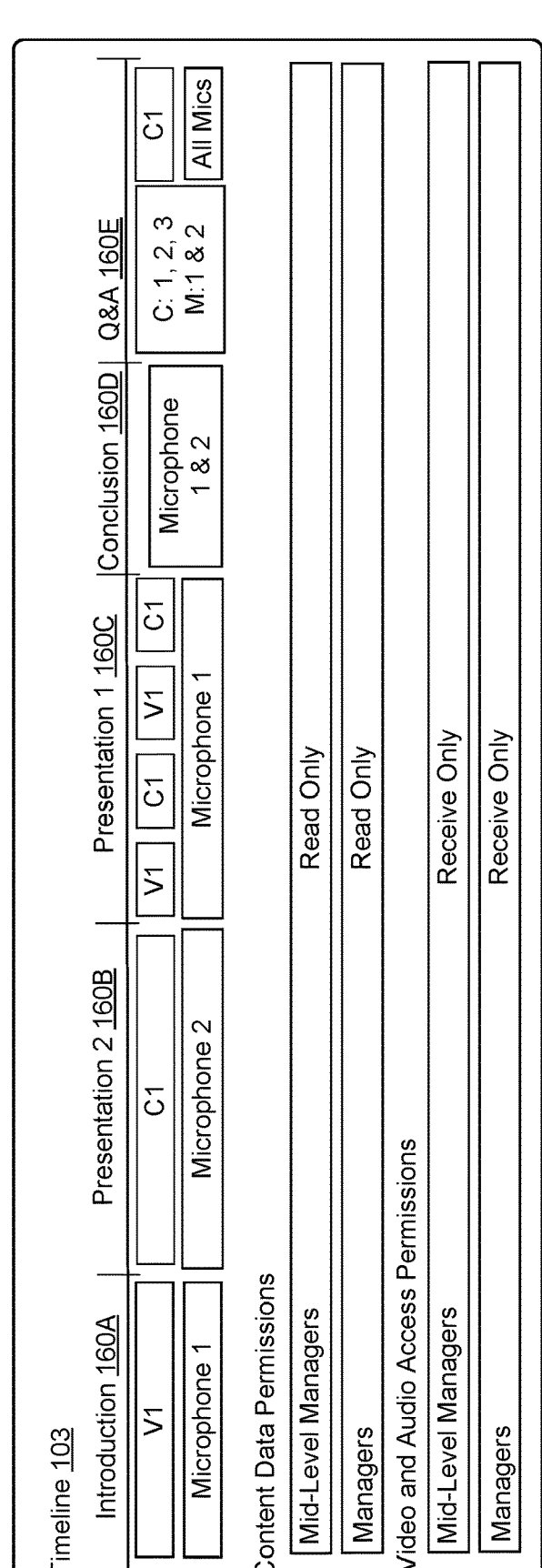
*FIG. 7A*

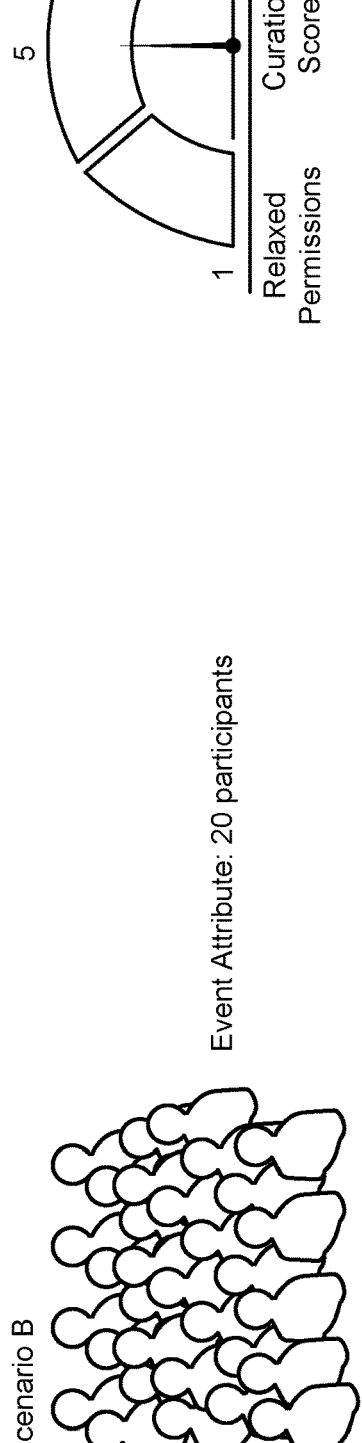
Scenario B
Event Attribute: 20 participants
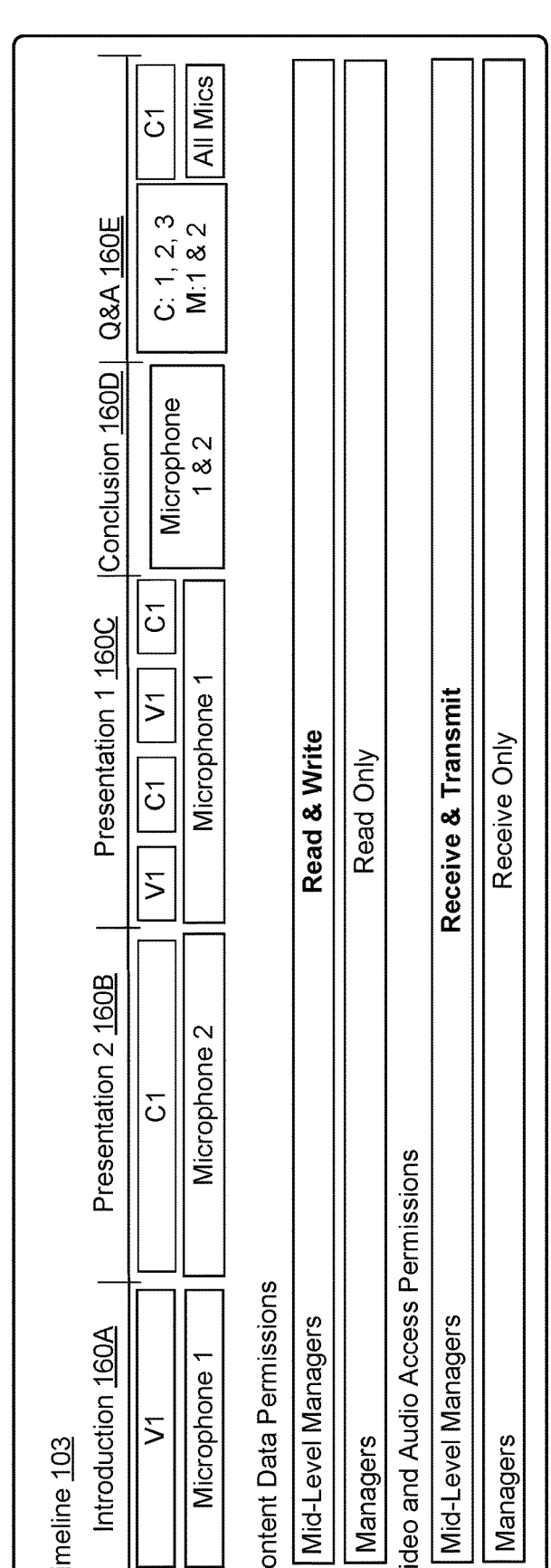
*FIG. 7B*

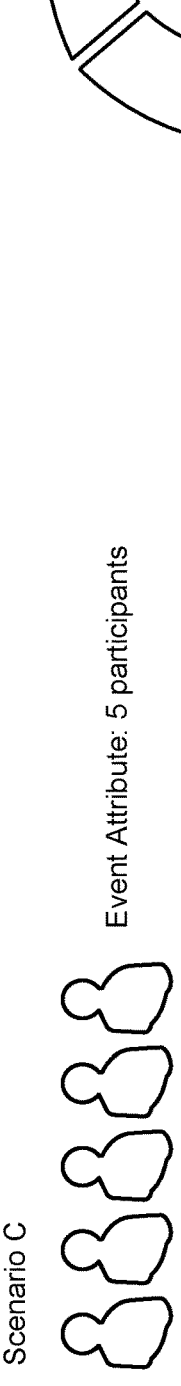
Scenario C
Event Attribute: 5 participants
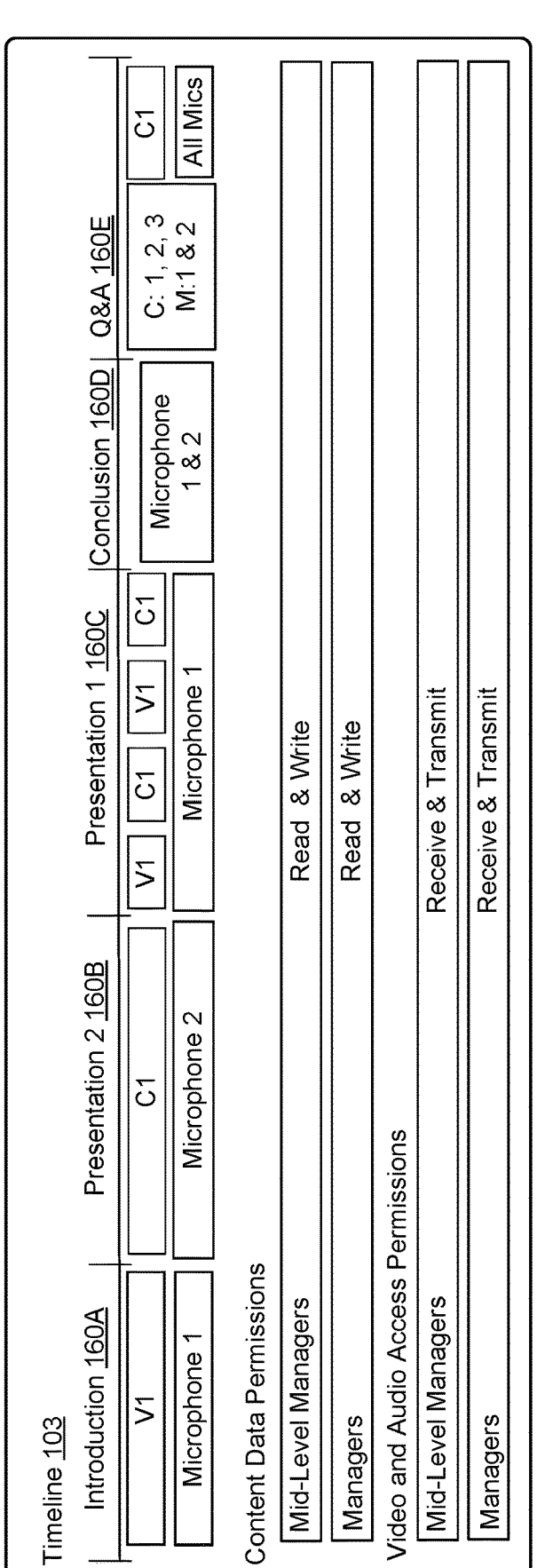
*FIG. 7C*

DYNAMIC CURATION OF SEQUENCE EVENTS FOR COMMUNICATION SESSIONS

PRIORITY INFORMATION

This application claims the benefit of and priority to U.S. patent application Ser. No. 16/215,387 filed Dec. 10, 2018 and entitled "DYNAMIC CURATION OF SEQUENCE EVENTS FOR COMMUNICATION SESSIONS," the entire contents of which are incorporated herein by reference.

BACKGROUND

Some computing systems provide collaborative environments that facilitate communication between two or more participants. A system providing a collaborative environment can allow participants to exchange live video, live audio, and other forms of data within a communication session. A collaborative environment can take on any suitable communication session format including but not limited to private chat sessions, multi-user editing sessions, group meetings, broadcasts, etc.

The optimization of user engagement in a communication session is essential for user productivity and efficient use of computing resources. When software applications do not optimize user engagement, production loss and inefficiencies with respect to computing resources can be exacerbated when a collaborative environment involves a large number of participants.

There are a number of drawbacks with some existing systems when it comes to the promotion of user engagement. For example, the layouts of some graphical user interfaces (UIs) do not always display shared content in a manner that is easy to read or pleasing to the user. Some systems often display video streams and images without properly aligning or scaling the content, and some systems do not always display the right content at the right time. Such systems work against the general principle that proper timing and graphical alignment of content are essential for the optimization of user engagement. In addition, having a less than optimal UI layouts can lead to other user interaction inefficiencies during the operation of an application.

Some existing systems provide tools for allowing users to manually modify a user interaction model of an application. For instance, some programs allow users to modify a user layout and also change audio settings to accommodate specific user needs. However, such systems require users to perform a number of menu-driven tasks to arrange graphical user interfaces, select content, and change audio and video settings. A user can spend a considerable amount of time searching through available items to select the content that is relevant to a particular purpose. Such systems then require users to manually generate a desired layout of selected graphical items. This can lead to extensive and unnecessary consumption of computing resources.

Existing systems that allow manual edits to user interaction models have other drawbacks. Most notably, although some systems allow users to arrange a UI layout, a user performing such tasks must be skilled at identifying layouts that positively or negatively impact user engagement. More importantly, users also need the appropriate experience to make timely adjustments that are necessary to stimulate or invigorate user engagement. Missed or incorrect opportunities in directing live events work against the overall productivity of the participants and computing resources used in facilitating a collaborative environment.

SUMMARY

The techniques disclosed herein provide dynamic curation of sequence events for communication sessions. A system can utilize smart filtering techniques to generate, modify, arrange, and select sequence events that are designed to optimize user engagement. The system can collect contextual data associated with a communication session, which can be in the form of a private chat session, a multi-user editing session, a group meeting, a live broadcast, etc. The system can utilize the contextual data, and other input data defining user activity, to customize sequence events defining contextually-relevant user interface (UI) layouts, volume levels, camera angles, special effects, and other parameters controlling aspects of the communication session. The system can apply the sequence events to specific points in a timeline that provides a visual representation of interaction models that are used to control and display aspects of a communication session.

The system can operate in an automated mode and apply the sequence events to specific points in a timeline without user input. The system can also operate in a manual mode and display recommended sequence events to a user for providing immediate access to live or ongoing editing opportunities. The system may select the automated mode, the manual mode, or combination of the modes based on a number of factors including the availability of resources and the detection of specific user scenarios. While in the automated mode, the sequence events can improve user engagement of a communication session even when a user is not available to manually edit aspects of the communication session. However, while in manual mode, the system can display suggestions of contextually-relevant sequence events to assist a user in making timely and effective modifications to aspects of a communication session.

In some configurations, a system can collect input data including, but not limited to, shared content, user preferences, or hardware data indicating the availability of devices used to facilitate an event. The system can generate customized sequence events based on the collected data. For instance, consider an example scenario where a user organizes an event. The system can identify the availability of devices such as, but not limited to, microphones, cameras, lights, and speakers. The system can then generate sequence events defining the parameters of a communication session that are specifically designed to utilize the available hardware. In addition, the system can customize each sequence event to display the shared content according to the user's preferences. Individual sequence events can each define unique parameters such as, a user interface layout, camera angle, volume level, and other device parameters. Multiple sequence events can be arranged in a timeline for the event.

The system can monitor user activity during an event, or during playback of an event, and further refine the parameters of each sequence event based on the detected activity. For example, the system may track a user's speech input or eye gaze direction and determine a level of engagement. In response to determining a threshold level of engagement, a system may take one or more actions, e.g., change a volume level of a sequence event, change the display of shared content, change which camera should be used within a sequence event, etc. The system can also re-order the sequence events within a timeline to raise user engagement at desired times.

In some configurations, a system can dynamically control access permissions for participants of a collaborative environment. The permissions can control access to specific content, editing capabilities, and access to devices used to facilitate a communication session. The system can dynamically change permissions for each participant based on a number of factors, including the detection of specific user scenarios. For instance, if an event includes a number of users each having specific permissions to edit the layout of a collaborative environment, those permissions may be strictly enforced or relaxed based on the number of participants. Thus, in an event that is characterized as a broadcast, e.g., an event having one presenter and several thousand attendees, permissions that restrict attendees from editing a layout may be strictly enforced to select users. However, in an event that is characterized as a meeting, e.g., an event having five attendees, permissions that restrict the attendees from editing a layout, may be relaxed. This dynamic control of permissions based on attributes characterizing an event allows applications to automatically adjust the security access to data and certain functionality to accommodate specific user scenarios, promote efficient use of computing resources, and improve the security of data.

The examples described herein are provided with context of collaborative environments, e.g., private chat sessions, multi-user editing sessions, group meetings, live broadcasts, etc. For illustrative purposes, it can be appreciated that a computer managing a collaborative environment involves any type of computer managing a communication session where two or more computers are sharing data. For illustrative purposes, an "event" is a particular instance of a communication session, which may have a start time, an end time, and other parameters for controlling how data is shared and displayed to users participating in the communication session.

The techniques disclosed herein provide a number of features that improve existing computers. For instance, computing resources such as processor cycles, memory, network bandwidth, and power, are used more efficiently as a system can transition between different interaction models without user input. In addition, the techniques disclosed herein improve security of the system. By dynamically changing permissions to data access and editing capabilities, a system can accommodate different needs based on the presence of specific user scenarios. The techniques disclosed herein also improve user interaction with various types of computing devices. Improvement of user interaction can lead to the reduction of user input, which can mitigate inadvertent inputs, redundant inputs, and other types of user interactions that utilize computing resources. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, augmented reality or virtual reality devices, video game devices, handheld computers, smartphones, smart televisions, self-driving vehicles, smart watches, e-readers, tablet computing devices, special-purpose hardware devices, networked appliances, and the others.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5C illustrates another example of an automatic adjustment that can be made to a timeline in response to detecting the presence of a predetermined condition.

FIG. 6A illustrates an example of a timeline that defines permissions for different categories of users.

FIG. 6B illustrates a scenario where a system monitors the activity of an audience and the presenter and sets permissions according to the activity.

FIG. 7A illustrates a scenario where a system sets strict permissions based on determining that a number of participants is within a first range.

FIG. 7B illustrates a scenario where a system sets moderate permissions based on determining that a number of participants is within a second range.

FIG. 7C illustrates a scenario where a system sets relaxed permissions based on determining that a number of participants is within a third range.

DETAILED DESCRIPTION

Figure 1:
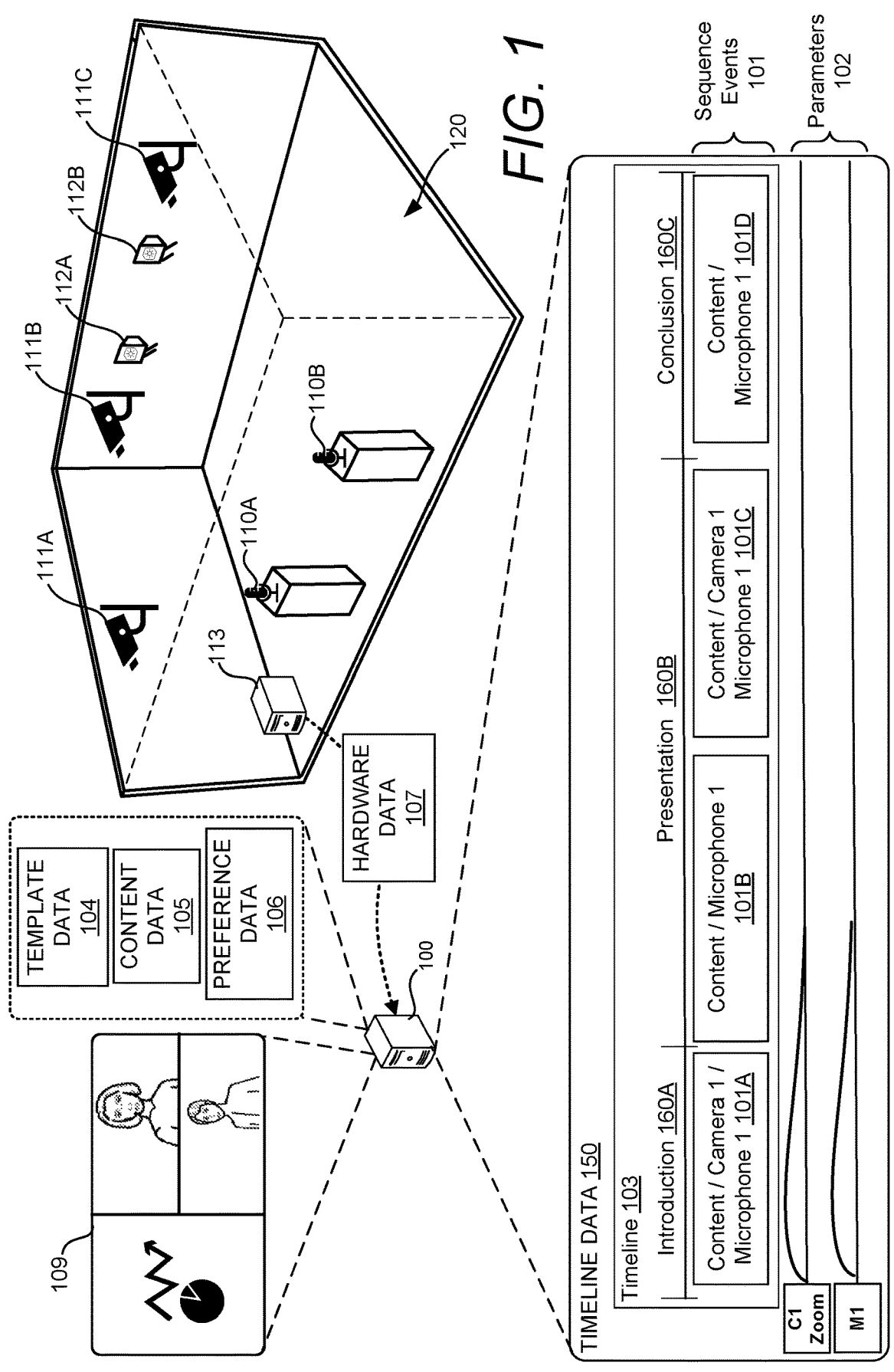
FIG. 1 illustrates an example scenario involving a system for generating sequence events for a timeline based on contextual data of a collaborative environment.

FIG. 1 illustrates an example scenario involving a system 100 for providing dynamic curation of sequence events 101 for a communication session. The system 100 can apply smart filtering techniques to generate, modify, arrange, and select sequence events 101 of a timeline 103. The configuration of each sequence event and the arrangement of a number of sequence events within a timeline can be designed to optimize user engagement. The timeline 103 can be used by the system 100 to adapt how an event is presented to, and controlled by, the participants of a communication session.

As the system 100 progresses through the timeline 103, the sequence events 101 cause the system 100 to transition through different user interaction models of a communication session. Each user interaction model can define uniquely tailored user interface (UI) layouts, volume levels, camera angles, special effects, or any other parameter associated with an input device, display device, or other associated devices. Each user interaction model can include individual or multiple sequence events for controlling parameters 102 of one or more hardware devices. For example, a first sequence event 101A for the timeline 103 defines parameters for controlling the display of content, parameters for controlling a camera, and parameters for controlling a microphone. A second sequence event 101B defines parameters for controlling the display of content and parameters for controlling a microphone. A third sequence event 101C defines parameters for controlling the display of content, parameters for controlling a camera, and parameters for controlling a microphone. A fourth sequence event 101D defines parameters for controlling the display of content and parameters for controlling a microphone. The sequence events can cause the system 100 to control a display 109, audio settings, and other devices that are used during a display of an event or during a playback of a recorded event.

The system can receive contextual data including, but not limited to, template data 104, content data 105, preference data 106, and hardware data 107. Various combinations of the contextual data can be used to generate sequence events 101, select sequence events 101, and determine an order of the sequence events 101 for a timeline 103. Individual sequence events can define one or more parameters 102 for controlling devices, e.g., microphones 110, cameras 111, lights 112, controllers 113, and other devices associated with a collaborative environment. Individual sequence events can also define UI layouts and content displays. Each sequence event can also define a time period in which the parameters are to be used.

The template data 104 defines predetermined timeline templates. For instance, a timeline template may include a number of sections such as an introduction section 160A, a presentation section 160B, and a conclusion section 160C. In another example, a timeline template may include other sections, including an icebreaker section and a Q&A section (not shown in FIG. 1). In some embodiments, the timeline templates can be used as a baseline to generate customized timelines. The timeline templates can be selected based on the presence of specific content and the presence of specific user scenarios, e.g., a number of attendees, title of the attendees, etc. For instance, based on the analysis of an outline of a slide deck, a template timeline having an introduction, a presentation and a conclusion may be selected. In another example, when a meeting invitation indicates the presence of one presenter and a large number of audience members, a template having a presentation section and a Q&A section may be selected.

The content data 105, also referred to herein as "user content 105," can comprise any image, document, video data, audio data, or any other information that can be used as presentation materials. The content 105 can also include other forms of data such as meeting requests, which can identify a number of attendees, titles associated with each attendee, and other related information. The content 105 can also indicate parameters for an event, such as a start time, end time, and a location. For example, the content 105 can include a meeting request indicating a list of attendees, the roles of each attendee, a date, a time, and a location.

The preference data 106 can include any information that conveys preferences for parameters or settings related to a collaborative environment. For instance, the preference data 106 can define user interface configurations, volume levels, camera angles, or other parameters that have been utilized by a particular user. The preference data 106 can also include historical information. For instance, the preference data 106 can include a list of meetings, the attendees of each meeting, and UI layouts used in each meeting. Such data enables the system 100 to determine a timeline template that best suits a particular list of attendees. The preference data 106 can be generated from machine learning modules that are configured to analyze a user's previous events. Thus, the preference data 106 can define the timing of how various parameters, e.g., camera angles, lighting, and UI layouts, can change over time.

The hardware data 107 describe aspects of hardware that is available to the system 100. For example, the hardware data 107 can describe aspects of various input devices, sensors, lights, microphones, sound dampening equipment and other hardware that can be used by the system 100. The hardware data 107 can also describe specifications for display screens or specifications of computers in communication with the system 100.

The hardware data 107 can also describe specifications of the available hardware, such as, but not limited to, sensitivity levels, zoom levels, etc. The hardware data 107 can also describe the position of each device and a scope for each device. For instance, the hardware data 107 can describe a location, position and viewing area of a particular camera, e.g., that a camera can capture speakers at a particular podium, on a stage, etc. In another example, the hardware data 107 can identify the location of a room microphone and coordinates defining the range of the microphone.

The hardware data 107 may also provide specifications for an event forum 120. For example, the hardware data 107 may define measurements of a room and the acoustic characteristics of the room. The hardware data 107 may also define other parameters of the forum (room) 120 such as, but not limited to, a number of speaker podiums, an audience capacity limit, etc. The hardware data 107 can be stored and managed by any suitable computing device, including a controller 113.

In the illustrative example of FIG. 1, consider a scenario where the content data 105 includes a transcript that includes a speech having an introduction, presentation, and conclusion. The content data 105 also includes a meeting request inviting ten (10) attendees and one presenter to an event designated to occur at a given start time. The meeting request also identifies the location, e.g. the room 120, of the event.

In this example, the hardware data 107 indicates the availability of two microphones 110 (110A-110B), three cameras 111 (111A-111C), and two lights 112 (112A-112B). The system 100 can filter a list of devices to specify the devices that are associated with the location indicated in the meeting request. The hardware data 107 also indicates that the first camera 111A is directed towards a first podium having the first microphone 110A, and that the second camera 111B is directed towards a second podium having a second microphone 110B.

The system 100 selects a template timeline from the template data 104 that matches the outline of the content data 105. This can be done by an analysis of the content data 105 to produce a candidate outline. A candidate outline that matches a template within a threshold level can be selected. As shown, the timeline 103 comprises an introduction section 160A, a presentation section 160B, and a conclusion section 160C.

By the use of the hardware data 107, the system 100 can select specific devices that are the best fit for presenting the content and other aspects of an event. In some embodiments, the system 100 can analyze the content and determine the number of speakers and select specific cameras and microphones according to the number of speakers. In this example, the content data 105 indicates a single speaker and the system 100 generates a series of sequence events 101 that are configured to utilize a camera directed towards a single presenter and a microphone that corresponds to a location in the camera's viewing angle. In this example, each sequence event 101 is configured to utilize the first microphone ("Microphone 1") and the first camera ("Camera 1").

In addition, the system can analyze the contextual data to make adjustments to the devices. For example, the system 100 can analyze the text of the speech and identify threshold levels of relevancy. When a threshold level of relevancy is indicated, inflections within the parameters 102, such as a zoom level or a microphone sensitivity level, can be adjusted to bring focus to a speaker or content.

This example is provided for illustrative purposes and is not to be construed as limiting. It can be appreciated that the room can include a number of other devices and the timeline can utilize other devices that are appropriate for a scenario indicated by the contextual data. For instance, the room 120 can include an audience microphone. If the timeline includes a Q&A section, a sequence event 101 associated with that section can be configured to utilize and control the audience microphone.

Figure 2:
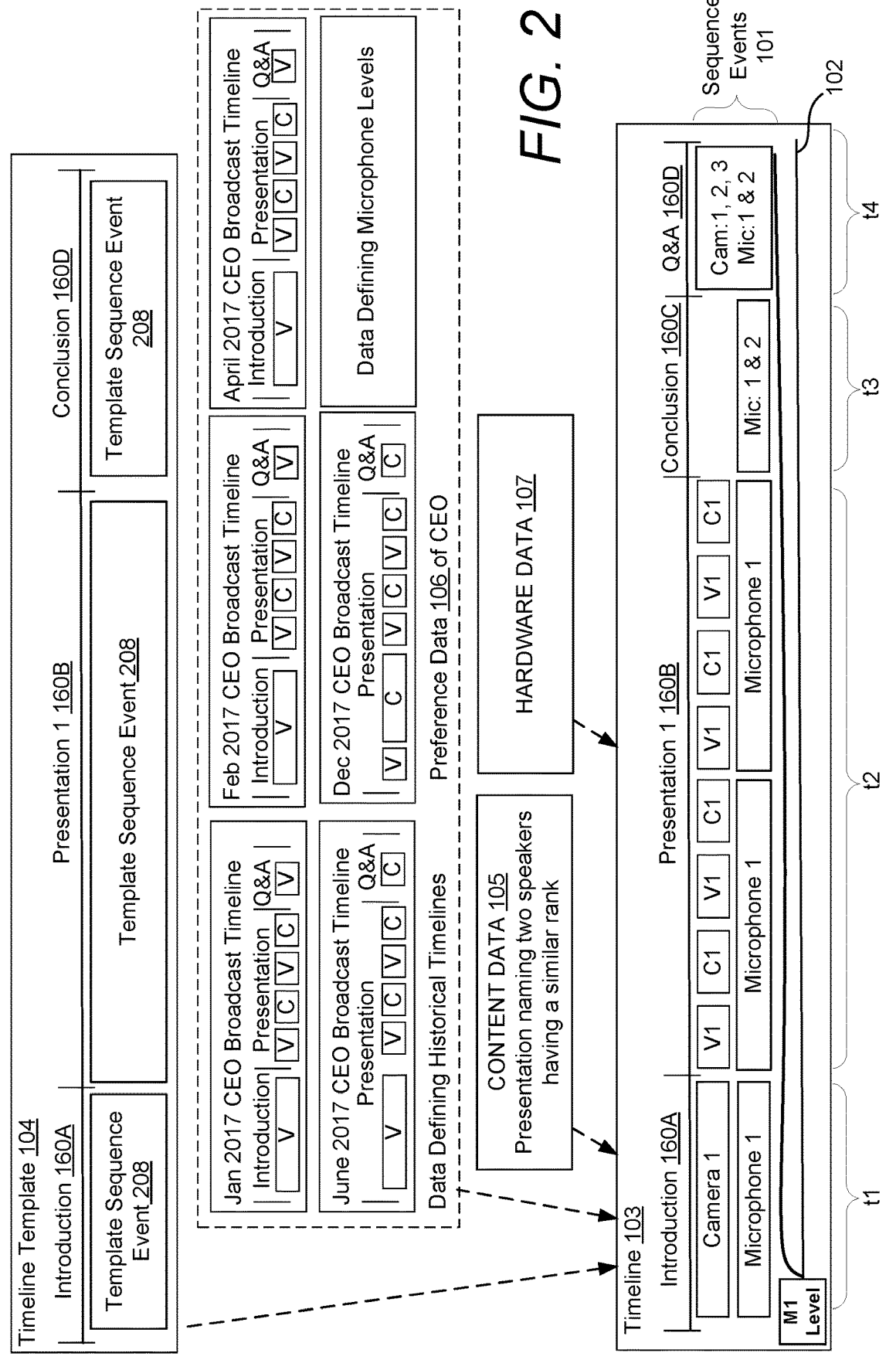
FIG. 2 is a block diagram illustrating an example scenario where specific types of contextual data can be used to generate a sequence events for a timeline.

FIG. 2 illustrates an example where a timeline 103 can be configured by the use of template data 104, content data 105, preference data 106, and hardware data 107. In this example, a timeline template 104 is customized by the use of preferences from a particular user, e.g., a CEO of a company, hardware of a particular location and content shared by the user.

The system 100 can analyze the preference data 106 to determine a preferred sequence events utilized by a particular person. In this example, the preference data indicates that the CEO has conducted a number of presentations and each presentation includes different combinations of sequence events. For example, the preference data indicates that a number of presentations, including the January-June 2017 presentations, started with a video stream from a camera directed at the presenter. In response to the identification of this pattern, the system 100 can configure the timeline 103 to activate a camera (C1) to start a presentation. In this example, a template sequence event 208 can be modified or replaced by sequence events defining specific parameters to activate a camera and a microphone. For instance, based on the availability of a camera and a microphone, sequence events, labeled as "Camera 1" and "Microphone 1," can cause the activation of these devices during a first time period (t1). Other template sequence events during other time periods can be modified in a similar manner.

Also in this example, the preference data indicates that a series of sequence events alternated between a display of a video stream (V) and a display of the shared content (C). Based on this pattern, the system 100 can generate a number of sequence events for the timeline 103 that alternate between a display of the first video camera (V1) and a display of the content (C1) during a second time period (t2). The system 100 can also analyze the preference data in the content data to generate sequence events, labeled as "Microphone 1," that cause the activation of a microphone associated with the first video camera.

Also shown in the preference data, the presentations previously conducted by the CEO included a display of content during a Q&A on two occasions and a display of a video stream on three occasions. Based on this pattern, and based on hardware data 107 indicating the availability of three cameras and two microphones, the system 100 can modify the timeline 103 to add a new segment 160D to the timeline, e.g., a Q&A section. In addition, the system can generate a sequence event that can cause the activation of the available video cameras and the available microphones.

The preference data 106 also indicates preferred microphone levels for a particular user, the CEO. Based on such contextual data, the parameters 102 for each microphone can be adjusted to the preferred levels. In addition, volume levels, zoom levels and other adjustable parameters for the hardware can be determined by an analysis of the content data and preference data.

The system 100 can also dynamically adjust one or more parameters that control a device, such as a zoom level for a camera, intensity levels of a light, sensitivity levels for a microphone, etc. Such adjustments can be based on the user preferences, user activity, the template data, and/or an analysis of the content data 105. For instance, the system 100 can analyze the text of a presentation and increase a zoom level or microphone sensitivity for a particular section of the presentation having a threshold priority level, e.g., salient content. For instance, the system 100 can analyze text of the presentation and identify salient content based on the presence of predetermined keywords or phrases. The system 100 can make adjustments to one or more parameters for controlling a device in response to the detection of salient content. The one or more adjustments to the parameters can bring focus to an aspect of a presentation of the salient content. In the present example, a zoom level "C1 Zoom" for the first camera directed towards a presenter is adjusted in response to identifying salient content within the introduction. In addition, the sensitivity level "M1" of the first microphone is raised during the same time period.

In some configurations, the system 100 can analyze content and dynamically change aspects of a timeline based on content that meets one or more criteria. For instance, when content indicates a particular user scenario, the system 100 can modify a sequence event, add a new sequence event, or rearrange the order of established sequence events based on an analysis of shared content. In some configurations, the order of the sequence events can be based on a placement parameter. For instance, a placement parameter can indicate that a first sequence event is positioned in front of a second sequence event. In another example, a placement parameter can indicate specific times at which a sequence event starts and ends.

For illustrative purposes, consider a scenario where a user modifies the presentation of the above-described example. In addition to the presentation of the CEO, the modification includes a second presentation by a CFO. In this example, the presentation also identifies the CFO. Using the identity of the new presenter, the system 100 retrieves the CFO's preferences.

Figure 3:
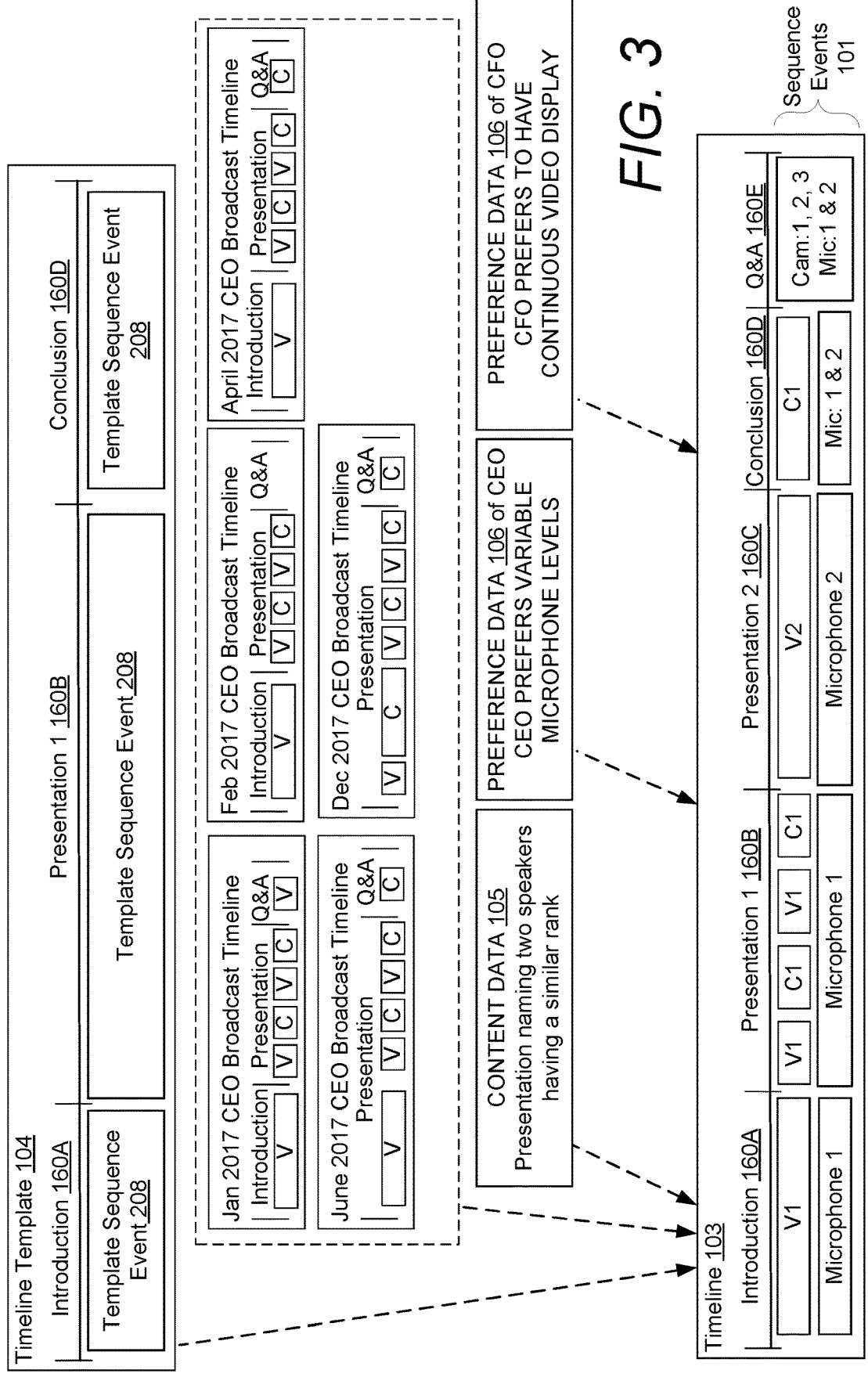
FIG. 3 is a block diagram illustrating an example scenario where a timeline can be modified based on an analysis of shared content.

In response to identifying a new presenter and retrieving the presenter's preferences, a new presentation section can be added to the timeline 103. With reference to the example of FIG. 3, a second presentation section "Presentation 2" 160C is added to the timeline 103. In addition, corresponding sequence events can be added to the timeline. In this example, the CFOs preferences indicate that the CFO desires to have a continuous video display of the speaker. In response to identifying a second presenter and in response to the second presenter's preferences, the system generates a sequence event "V2" for causing the display of a video stream of the second camera. In addition, the system generates a corresponding sequence event "Microphone 2" for causing the exclusive activation of a second microphone.

Figure 4:
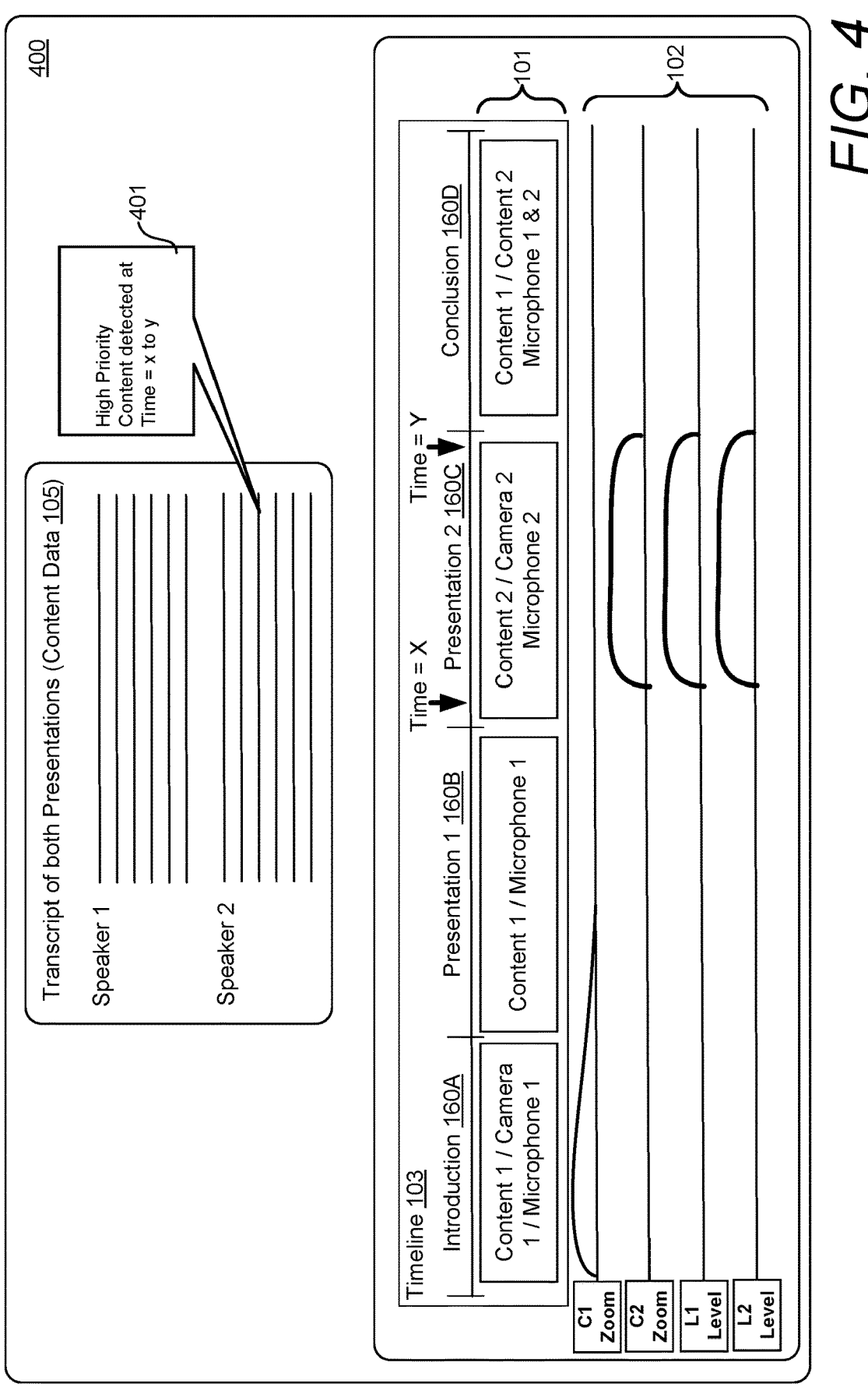
FIG. 4 illustrates examples of additional parameters that can be modified based and tiered on the analysis of shared content.

FIG. 4 illustrates examples of additional parameters that can be modified based on the analysis of shared content. In this example, consider a scenario where the system 100 analyzes the transcripts of two presentations. When the system 100 identifies a section of content having a threshold priority level, the system can adjust a number of parameters to bring focus to that section of content. The priority level for a particular section of content can be analyzed using techniques, including machine learning techniques, for understanding keywords and phrases that are relevant to a particular audience. The system can generate a priority level for any section of content and compare a determined priority level with a threshold. In response to detecting a threshold priority level, the system takes one or more actions for modifying or creating a sequence event configured to improve user engagement.

In this example, the system determines that a section of content having a threshold level of priority starts at time X and ends at time Y. In response to determining that at least one section of the content has a threshold priority level, one or more parameters can be adjusted. For instance, a camera zoom "C2 Zoom" and one or more light levels, "L1 Level" and "L2 Level," can be adjusted. In some embodiments, the content data 105 and the timeline 103 can be displayed on a user interface 400. The user interface 400 can display a graphical element 401 to identify a section of content having a threshold priority level. The adjustments to the parameters for controlling a device can also include adjusting a user interface layout on a computer. The adjustments to the parameters can be used to update a timeline 103.

As summarized above, the system in automated mode can adjust sequence events or change the order of sequence events based on user activity. In some embodiments, the system 100 can detect levels of engagement with respect to a user. For example, the system may track a user's eye gaze direction and determine a level of engagement based on the pattern of movement, or a particular gesture, such as a user closing their eyes. In another example, the system can determine when audience members are engaging in a particular activity, e.g., taking notes. Such actions can be captured by the use of a video camera directed towards users or by the use of input sensors, such as a notepad with an input surface, monitoring the activities of an audience.

A threshold level of engagement can be identified when users are taking notes or when a predetermined pattern of movement is detected. A threshold level of engagement can be identified when a user stops taking notes, starts taking notes, when a user starts moving in a predetermined pattern, or when a user stops moving in a predetermined pattern. A threshold level of engagement can be identified when the user performs a specific gesture or ceases to perform a specific gesture. A threshold level of engagement can be identified when a user's eye gaze does not focus on a particular target or when the user's eye gaze focuses on a particular target for a predetermined period of time. Such activities can apply to categories of users. For instance, a threshold level of engagement can be identified when an audience collectively performs a specific gesture, but the threshold level of engagement is not identified when other individuals having different roles or titles individually perform that specific gesture.

In response to identifying a threshold level of engagement, a system may take one or more actions, e.g., change a volume level of a device, change the display of shared content, change which camera should be used within a sequence event, etc. The system can also re-order the sequence events within a timeline to raise user engagement at desired times.

Figure 5A:
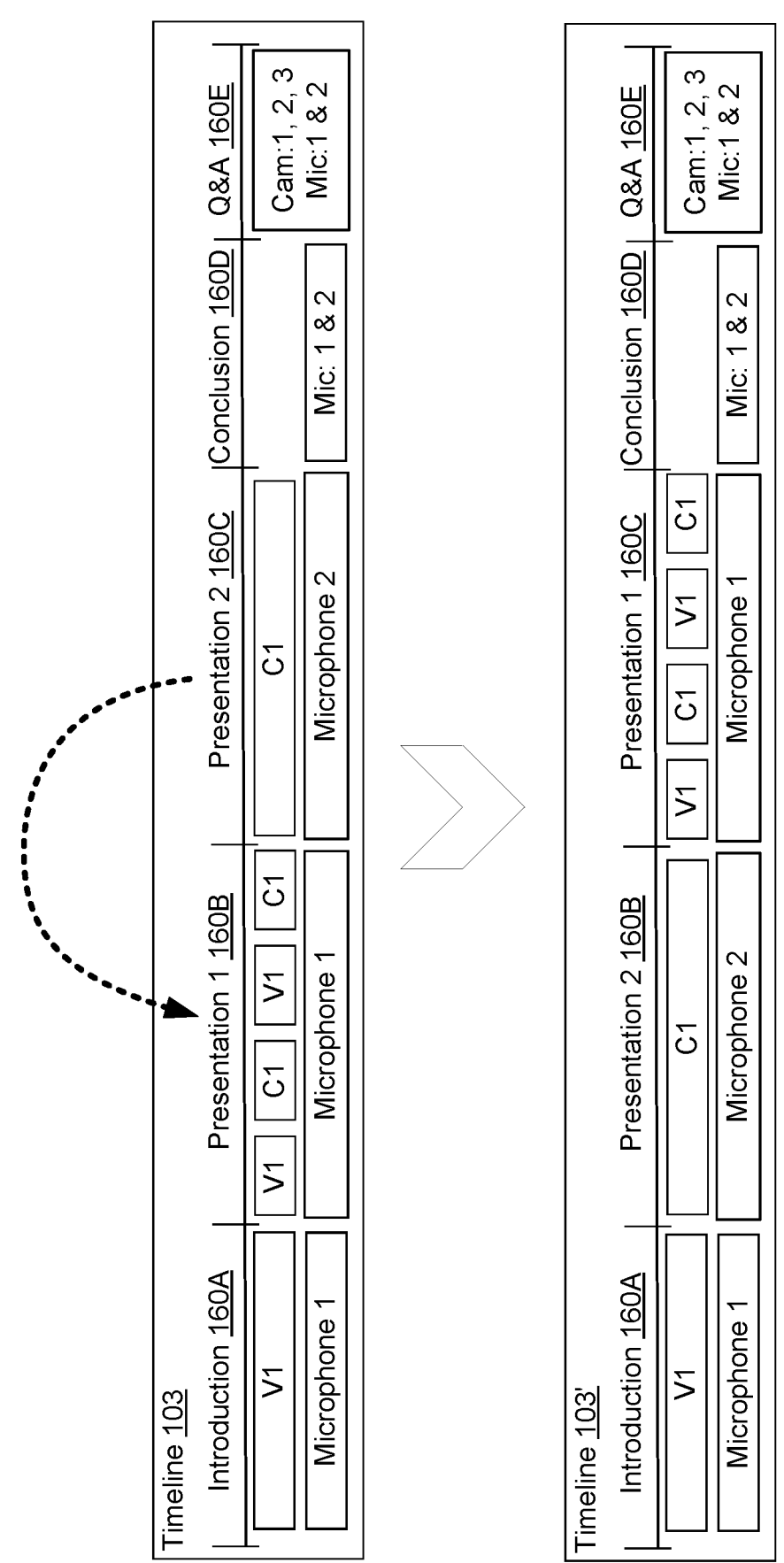
FIG. 5A illustrates a scenario where a system detects a threshold level of engagement during a presentation.

In the example shown in FIG. 5A, consider a scenario where the system detects a threshold level of engagement during the second presentation, Presentation 2. For example, the system detected that a threshold number of participants started to take notes. In this example, preference data also indicates a desire to have the threshold level of engagement earlier in the meeting rather than later. In response to such a scenario, the system can rearrange the order of the presentations to bring the section having the threshold level of engagement to an earlier section of the meeting. In this example, since the level of engagement is higher in the second presentation, Presentation 2, versus the first presentation, Presentation 1, the system may move the second presentation ahead of the first presentation. The system can generate an updated timeline 103' to indicate this change. The updated timeline 103' can be used as a template for future meetings or used for a playback of a recorded meeting.

Figure 5B:
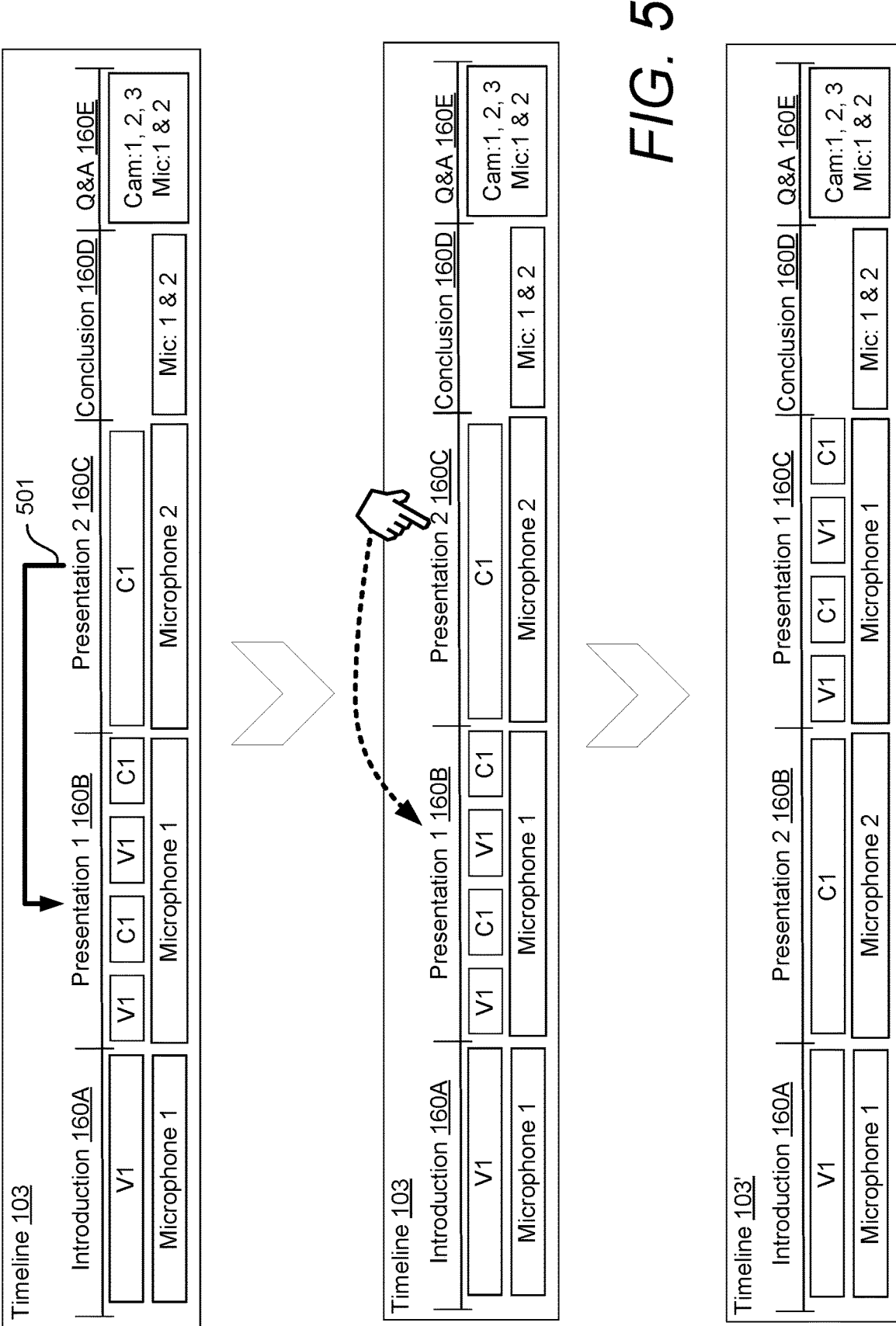
FIG. 5B illustrates an example of a suggestion that can be displayed to a user for providing immediate access to live or ongoing editing opportunities when the system is operating in an automated mode.

As summarized above, instead of making automatic adjustments to a timeline 103, the system 100 can operate in manual mode and generate suggestions for making adjustments to the sequence events. FIG. 5B illustrates one example of a suggestion 501 that can be displayed to a user for providing immediate access to live or ongoing editing opportunities. In this example, in response to detecting the presence of a predetermined condition, such as a threshold level of engagement and/or a threshold priority level, the system can display a graphical element, an annotation, or generate any form of output suggesting a change with respect to a sequence event. A suggestion can be in the form of a graphical element, a computer-generated voice, or any visual indicator. As shown in FIG. 5B, in response to the suggestion 501, a user can manually adjust the sequence events, or approve a suggestion, to produce an updated timeline 103'.

FIG. 5C illustrates another example of an automatic adjustment that can be made to a timeline 103 in response to detecting the presence of a predetermined condition. In this example, the system detects a threshold level of user engagement during a Q&A section 160E. If the preference data indicates a priority with respect to maintaining a high level of user engagement, when a threshold level of user engagement is detected, the system can modify or rearrange the sequence events to maintain the threshold level of user engagement. In this example, in response to detecting a threshold level of engagement, the system extends the length of the Q&A section 160E and produces an updated timeline 103'.

Figure 5D:
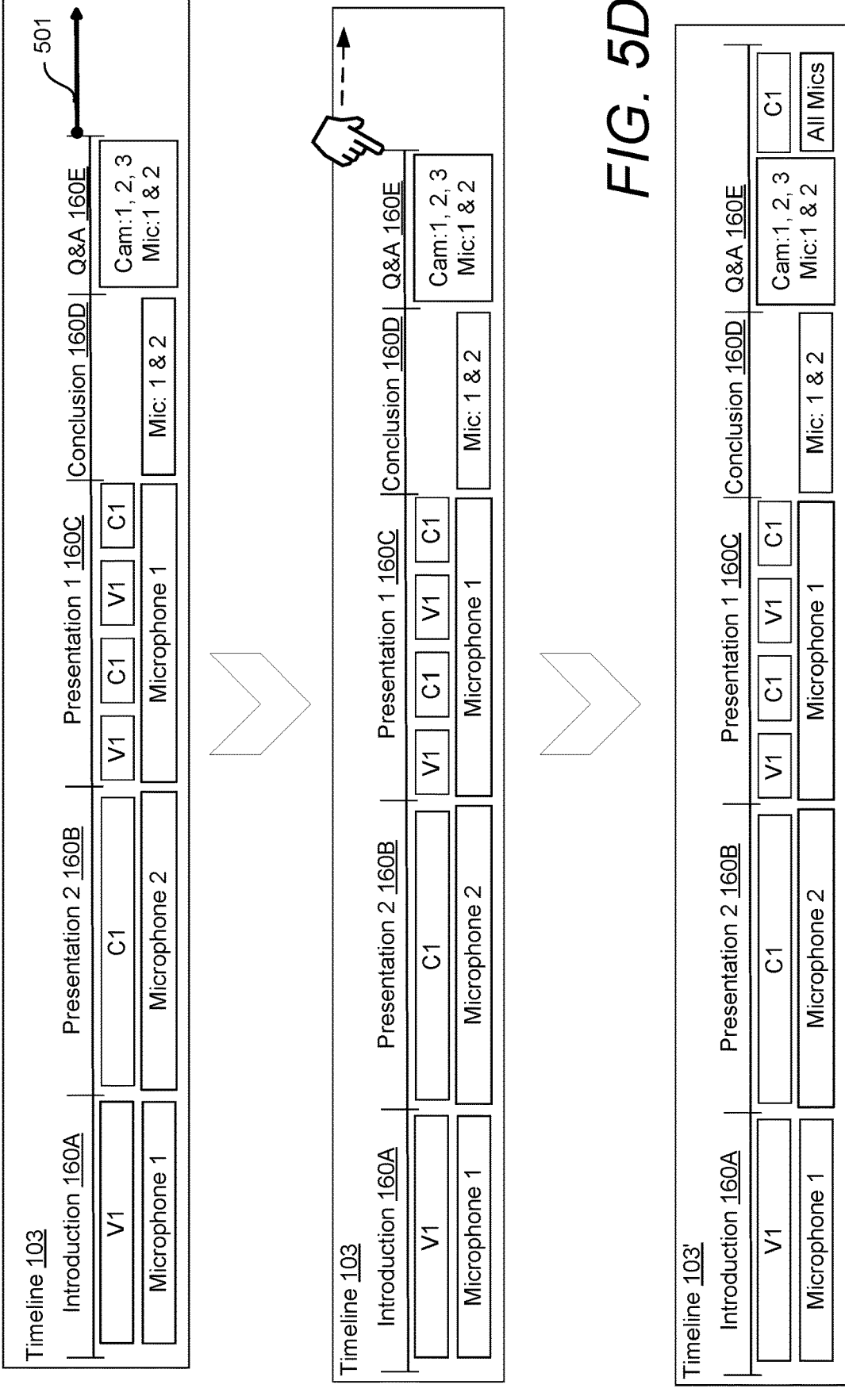
FIG. 5D illustrates another example of a suggestion that can be displayed when the system is operating in manual mode.

FIG. 5D illustrates another example of a suggestion 501 in the form of a graphical element that can be displayed when the system is operating in manual mode. This example illustrates a suggestion 501 that suggests an extension of the Q&A section 160E. As shown in FIG. 5D, in response to the suggestion 501, a user can manually adjust, or approve an adjustment of, the sequence events to produce an updated timeline 103'. It can be appreciated that an adjustment that is made to a timeline 103 can also mean making a change to a live feed that is shared with users of a communication session.

As summarized above, the system can dynamically control permissions for participants of a collaborative environment. Permissions can control access to specific content, editing capabilities, and access to one or more hardware devices. The system can dynamically change permissions for each participant based on a number of factors, including the presence of specific user scenarios. For instance, if an event includes a number of users each having specific permissions to edit the layout of a collaborative environment, those permissions may be strictly enforced or relaxed based on the number of participants. Thus, in an event that is characterized as a broadcast, e.g., an event having one presenter and several thousand attendees, permissions that restrict audience members from editing a layout may be strictly enforced. However, in an event that is characterized as a meeting, e.g., an event having five attendees, permissions that restrict the attendees from editing a layout may be relaxed. This dynamic control of permissions based on attributes characterizing an event allows applications to automatically adjust the security access to data and certain functionality to accommodate specific user scenarios. This dynamic control of permissions can also improve the overall security of the system, devices of the system, and content data.

FIG. 6A illustrates an example of a timeline that defines permissions for different categories of users. In this example, a timeline 103 defines three categories of users: presenters, organizers, and audience members. In this example, with respect to shared content, presenters have read-only permissions, organizers have read and write permissions, and audience members have read-only permissions. With respect to the audio data, the presenters have the ability to provide input using designated input devices, Microphone 1 and Microphone 2. With respect to the timeline 103 editing permissions, presenters and organizers have read and write permissions while audience members have no access to editing or viewing features with respect to the timeline 103.

It can be appreciated that the permissions can change over time. For instance, when it comes to the shared content, the audience members have read-only permissions up to the conclusion of the presentation. During the conclusion and during the Q&A section, the audience members have the ability to add annotations to the content. In addition, during the Q&A section, the audience members are allowed to provide audio input during the Q&A section.

The permissions can also be modified by the system in response to the identification of one or more conditions. For instance, the system may monitor conversations within an audience. The system may also determine when members of the audience have predetermined expressions, e.g., ask specific questions relating to a topic, express a concern, etc. In response to identifying the presence of a predetermined expression, the system may modify a sequence event.

For example, with respect to FIG. 6B, consider a scenario where a system 100 monitors the activity of an audience and the presenter. If it is determined that the presenter has concluded a speech ahead of schedule, and the audience starts to ask questions during the presentation section 160C, the system may modify the permissions to allow the audience to have access to the room microphone during the presentation section 160C.

In another example, if the presenter indicates a need to modify shared content, the system may grant read and write permissions to the presenter. Such modifications can also be in response to a direct user input. For instance, if the organizer has read and write permissions for the timeline, the organizer can provide a manual input to change the audio permissions to open the microphones to the organizer. These examples are provided for illustrative purposes and are not be construed as limiting. Thus, it can be appreciated that any type of modification to any sequence event can be performed in response to the detection of a particular user scenario.

In some embodiments, the system 100 can dynamically control permissions for individual users or roles associated with users based on the presence of specific user scenarios. In one illustrative example, permissions for individual users or permissions for groups of users can be based on a curation score. The curation score can be based on a number of factors including a number of participants in an event, a number of invitees, a number of invitees that have accepted an invitation, a number of invitees that have declined an invitation, a number of presenters, a number of audience members, a type of shared content, a level of security associated with shared content, a title or a role associated with the participants, etc.

FIGS. 7A-7C illustrate example scenarios showing how a curation score can be used to modify permissions for individual users and groups of users. In this example, the curation score is based on a number of participants of an event. Generally described, the curation score can be within a predetermined range, e.g., 1 to 10. The permissions allocated to individual users and groups of users can be based on the curation score. Curation scores that are near one end of the range can have a relaxed policy and curation scores near the opposite end of the range can have a more strict policy. Curation scores in the middle of the range can use a combination of the relaxed and strict policies to provide a more granular level of control of data with respect to specific users and specific groups of users.

In the example shown in FIG. 7A, a meeting request indicates that the number of participants is fifty (50). For illustrative purposes, this number of the participants causes the system to generate a curation score of ten (10). Based on this score, the system can configure the timeline to define strict policies for the individuals and groups of individuals. As shown, individuals having manager and mid-level manager roles have read-only access to the content data and can only receive video and audio data. In one illustrative implementation, a curation score exceeding a threshold can cause the generation of permissions that allow read-only permissions or complete restriction with respect to editing of content data, video data, and audio data.

The example shown in FIG. 7B illustrates another scenario where a meeting request indicates that the number of participants is twenty (20). For illustrative purposes, this number of participants causes the system to generate a curation score of five (5). Based on this score, the system can configure the timeline to define permissions that utilize a combination of strict and relaxed policies. As shown, based on the score, individuals having mid-level manager roles have read and write access to the content and receive and transmit permissions for video and audio data. The individuals having manager roles still have read-only access to the content data and can only receive video and audio data.

The example shown in FIG. 7C illustrates another scenario where a meeting request indicates that the number of participants is five (5). For illustrative purposes, this number of the participants causes the system to generate a curation score of one (1). Based on this score, the system can configure the timeline to define permissions that utilize a relaxed policy. As shown, based on the score, individuals having mid-level manager and manager roles have read and write access to the content and receive and transmit permissions for video and audio data.

Although these examples in FIGS. 7A-7C illustrate a change within permissions based on a curation score, it can be appreciated that permissions can be modified in other ways. For instance, the system can generate data defining exceptions to certain restrictions based on the curation score. For example, in the example shown in FIG. 7B, instead of changing the permissions for mid-level managers, the system can maintain the same permissions but allow exceptions to any restriction established by those permissions when a curation score meets one or more criteria.

Although these examples involve the generation of a curation score based on a number of participants in an event, for any embodiment disclosed herein, it can be appreciated that other factors can influence the curation score. For instance, a number of presenters can cause the curation score to increase or decrease, a number of audience members can cause the curation score to increase or decrease, a type of shared content can cause the curation score to increase or decrease, and a level of security associated with shared content can cause the curation score to increase or decrease. In other examples, the curation score can increase or decrease based on at least one of a number of invitees that have accepted an invitation, or a number of invitees that have declined an invitation. In yet other examples, the curation score can increase or decrease based on the roles or rankings of individuals.

Any of these factors can be scored individually and weighted based on other contextual information. The individual scores and/or the weighted scores can be processed to determine a curation score. For instance, the number of invitees can be used to generate a first score, and the first score can be multiplied by a first weighting factor to generate a first weighted score. The system can also use the rankings of individuals to generate a second score, and the second score can be multiplied by a second weighting factor to generate a second weighted score. The weighted scores and/or the un-weighted scores then can be multiplied, summed or otherwise combined to generate a curation score. This example is provided for illustrative purposes and is not to be construed as limiting. It can be appreciated that any combination of factors, and any weight distribution model, can be utilized to generate a curation score.

As summarized above, the system can operate in an automated mode and apply the sequence events to specific points in a timeline without user input. The system can also operate in a manual mode and display recommended sequence events to a user for providing immediate dynamic access to live or ongoing editing opportunities. The system may select the automated mode, the manual mode, or a combination of the modes based on a number of factors including the availability of resources and the presence of specific user scenarios. In one illustrative example, the system may select the automated mode, the manual mode, or combination of the modes based on a number of attendees, a number of presenters, a number of audience members, and/or a value indicating a title or rank of one or more attendees. In one illustrative example, the system may select the automated mode, the manual mode, or combination of the modes based on a curation score.

Figure 8A:
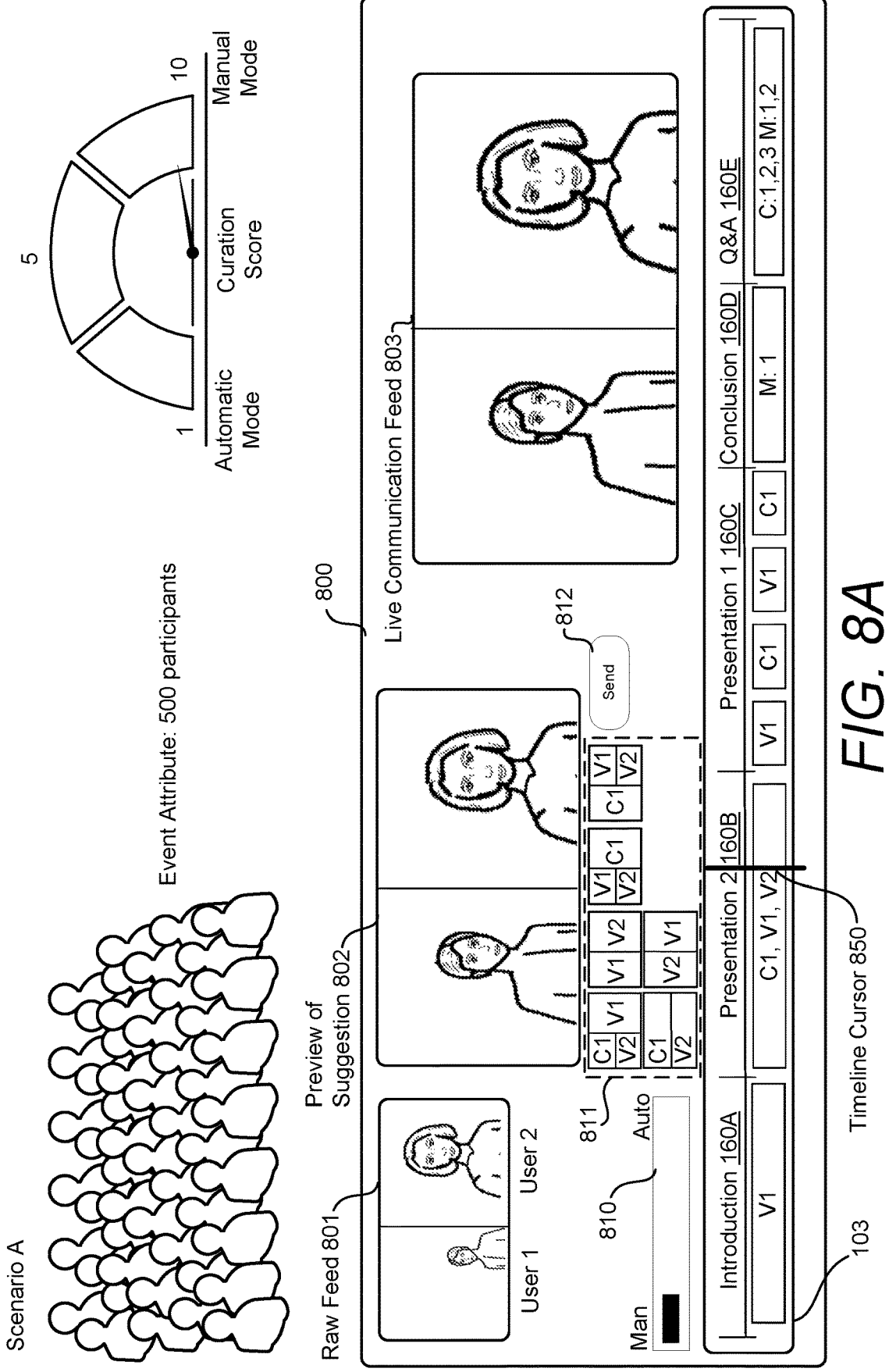
FIG. 8A illustrates a scenario where a system operates in manual mode based on determining that a number of participants is within a first range.
Figure 8B:
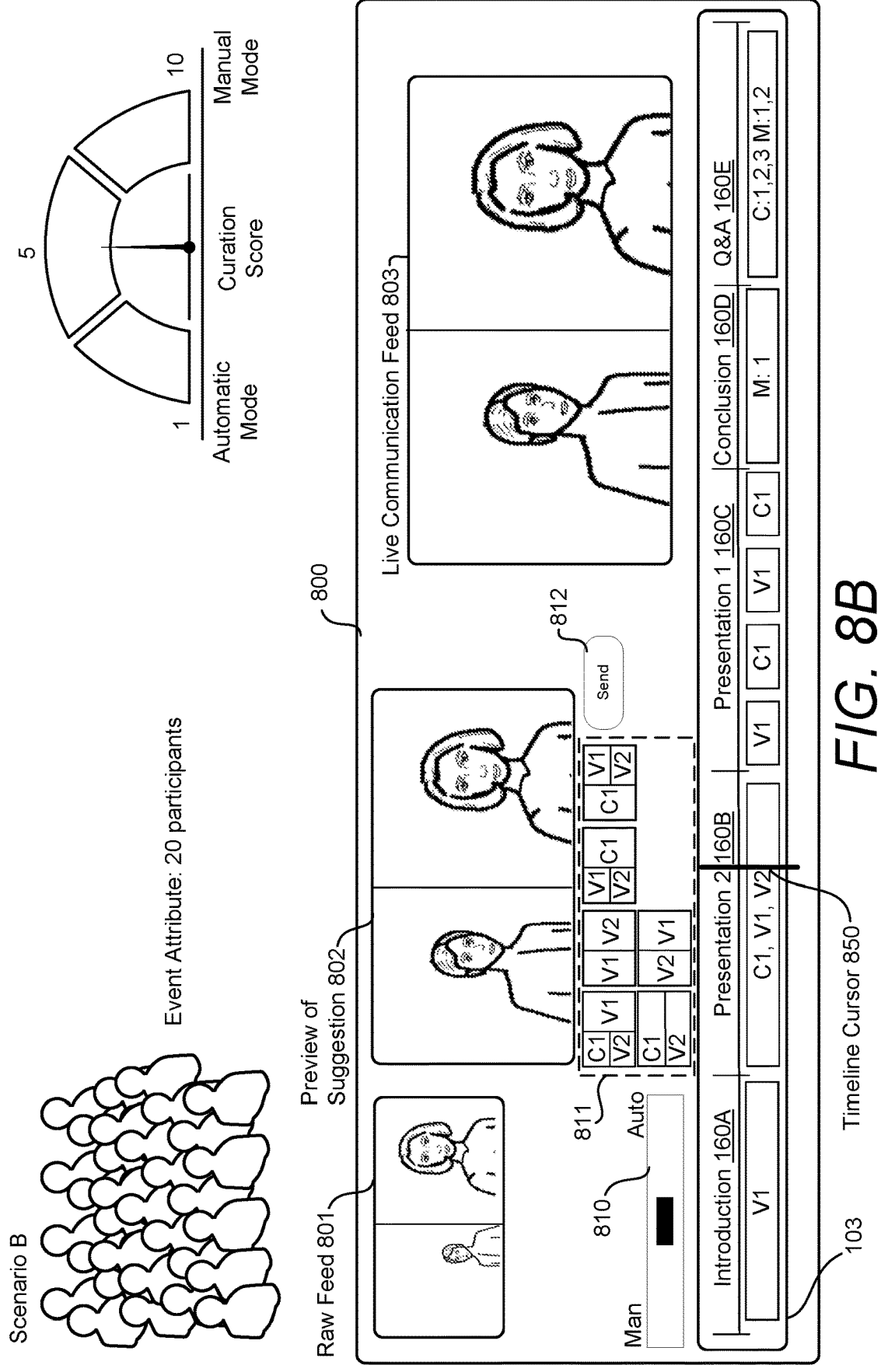
FIG. 8B illustrates a scenario where a system operates in a semiautomatic mode based on determining that a number of participants is within a second range.
Figure 8C:
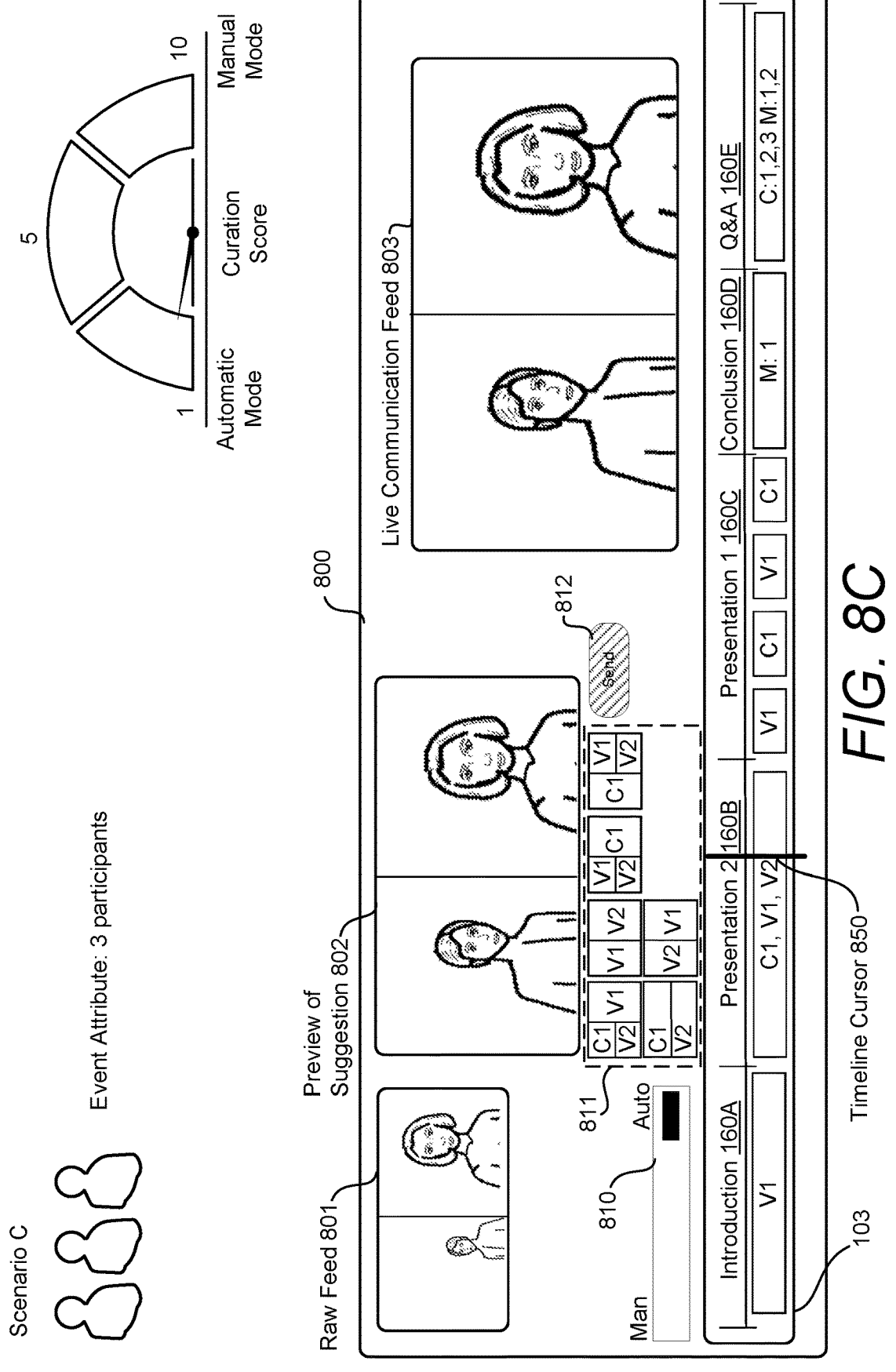
FIG. 8C illustrates a scenario where a system operates in an automatic mode based on determining that a number of participants is within a third range.

FIGS. 8A-8C illustrate example scenarios showing how a curation score can be used to select an operating mode that may be applied to certain users or certain types of users. In some embodiments, the curation score can be within a predetermined range, e.g., 1 to 10. The operating mode of the system can be based on the curation score. Curation scores that are near one end of the range can cause the system to operate in manual mode and curation scores near the opposite end of the range can cause the system to operate in automatic mode. Curation scores in the middle of the range can use a combination of the modes, also referred to herein as a semiautomatic mode or a semi-manual mode. For instance, while in semiautomatic mode, certain categories of sequence events or certain actions can be automatically inserted into a timeline while other categories of sequence events require user input to be inserted into the timeline. As the curation score is reduced, more categories of sequence events or types of adjustments to sequence events can be automatically inserted into the timeline.

In the example shown in FIG. 8A, a meeting request indicates that the number of participants is five hundred (500). For illustrative purposes, this number of participants causes the system to generate a curation score of ten (10). Based on this score, the system can operate in a manual mode, where a user is required to interact with the user interface 800 to accept and send suggested sequence events to a timeline.

In the example shown in FIG. 8A, the user interface 800 comprises several display areas showing a raw feed 801, a preview of suggested modifications 802, and a live communication feed 803. The user interface 800 also comprises an input control element 810 for displaying the operating mode and for allowing user input to control the operating mode. The user interface 800 also comprises menu options 811 showing a number of suggested layouts. The user interface 800 also comprises a control mechanism 812 for allowing a user to manually send suggested modifications to the timeline 103 and/or the live communication feed 803. The user interface 800 can also include a timeline cursor 850 that shows a current point in time for a live event or a current point in time for a playback of a recorded event.

With reference to the above-described example of the system operating in manual mode, when the system generates a suggestion for modifying the timeline, e.g., the system generates a sequence event defining those modifications. The user interface 800 shows the suggested modifications in a preview display area 802. This arrangement allows the user to compare the suggested modifications to the actual raw feed 801, which shows video data and content received from remote computers without any modifications. In this example, the raw feed 801 shows video data of two participants of the event. As shown, the video data of each user contains images that are at different scales and images that are not aligned. The system may detect such discrepancies and correct the alignment of the users and also correct the scale of at least one of the video streams to enable the system to align the size and orientation of each rendering.

The system can also detect a context with respect to each user. For instance, the system can detect that User 1 is to be displayed on the left half of the screen and User 2 is to be displayed on the right half of the screen. The system can also detect that the raw feed for User 1 shows that User 1 is looking towards the left side of the screen. In response to detecting such scenarios, the system can make adjustments to correct the orientation of the users to give the appearance that they are looking at each other. In the illustrated example of FIG. 8A, the image of User 1 is mirrored to give the appearance that User 1 is looking at User 2 during the conversation. This special effect in addition to the alignment and scale adjustments are displayed in the preview area 802. Based on the operating mode of the system, the system will respond to a user input, which can include a voice command, a gesture and/or a selection of the control mechanism 812, by sending the suggested modifications to the live feed 803 and/or sending the sequence event defining those modifications to the timeline 103.

It can be appreciated that a user reviewing suggestions produced by the system can have permissions to update the timeline 103 and/or the live communication feed. In some embodiments, the system can automatically adjust permissions for a particular user when the system transitions between automatic mode and manual mode. When a system is an automatic mode, the system may restrict timeline edits. When the system transitions to a semiautomatic mode or a manual mode, permissions may be granted to a particular user or a group of users for editing the timeline 103 and/or making modifications to the live communication feed.

The example shown in FIG. 8B illustrates another scenario where a meeting request indicates that the number of participants of an event is twenty (20). For illustrative purposes, this number of the participants causes the system to generate a curation score of five (5). Based on this score, the system can operate in a semiautomatic mode, where specific categories of suggested modifications can be automatically sent to the live communication feed and/or the timeline, while other categories of suggested modifications may require a user input to send the modifications to the live communication feed and/or the timeline.

The system can select predetermined categories of modifications to be automatically sent to the communication feed 803 and/or the timeline 103. For instance, when the system generates a suggestion to modify a predetermined category of modifications, such as a change to a video special effect, such modifications can be automatically sent to the communication feed 803, a sequence event, and/or the timeline 103. However, if the system generates a suggestion to modify another predetermined category of modifications, such as an audio setting, such modifications may require a user input to approve the suggested modifications, e.g., the system may not automatically send such modifications to the communication feed 803, a sequence event, and/or the timeline 103.

In one illustrative example, while in semiautomatic mode, a suggestion may appear in the preview area 802 for a predetermined period of time. After the predetermined period of time, the suggested modification may be sent to the live communication feed 803 and/or the timeline 103. As the curation score is reduced, the predetermined period of time can be reduced.

The example shown in FIG. 8C illustrates another scenario where a meeting request indicates that the number of participants is three (3). For illustrative purposes, this number of the participants causes the system to generate a curation score of one (1). Based on this score, the system can operate in an automatic mode, where the suggested modifications are automatically sent to the live communication feed and/or the timeline. When operating in this mode, the user interface 800 can also modify one or more graphical elements to indicate that the system is operating in automatic mode. In the illustrated example shown in FIG. 8C, the control mechanism 812 is shaded to indicate that the control mechanism 812 is deactivated, another indicator that the system is operating in automatic mode.

Also shown in FIGS. 8A-8C, the input control element 810 also indicates a selected operating mode. The user can interact with the input control element 810 to change the operating mode of the system. For instance, based on a user input at the control element 810, the system can transition from manual mode to automatic mode, transition from automatic mode to manual mode, or transition to a semiautomatic mode in response to a user interacting with the control element 810. Although this example shows the control element 810 as a slide bar, it can appreciated that the control element 810 can be in any form including a computer-generated voice indicating an operating mode, and an input can be a voice command.

As described above, the system can operate in different modes to accommodate different user scenarios. While in the automated mode, the sequence events can improve user engagement even when a user is not available to direct the parameters of a collaborative environment. Such configurations are beneficial for small meetings where a dedicated person is not available to direct the content. However, while in manual mode, the system can display suggestions of contextually-relevant sequence events to assist a user making timely and effective modifications to a collaborative environment. Such configurations are beneficial for large broadcasts and/or meetings where the availability of a person for directing the content is more likely.

Figure 9A:
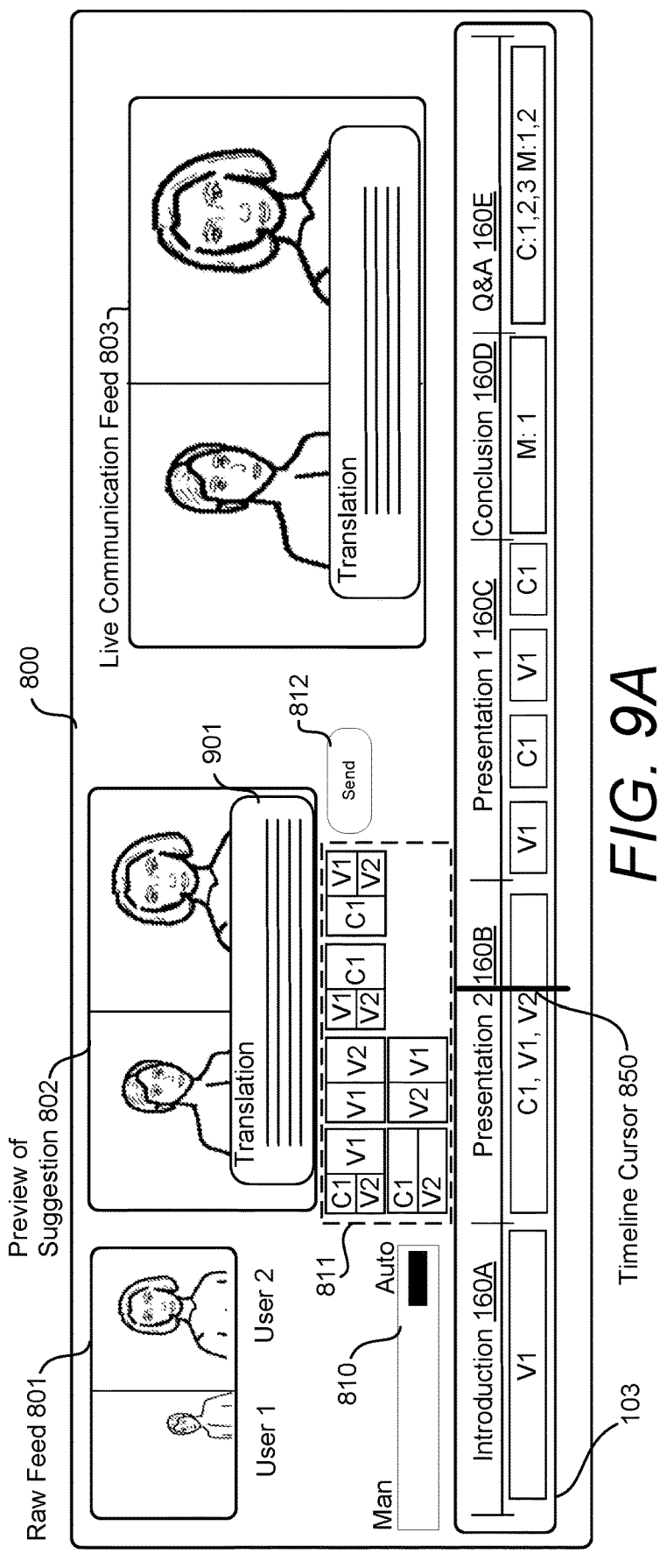
FIG. 9A illustrates modifications to a sequence event that are automatically applied to a timeline based on monitored activity.
Figure 9B:
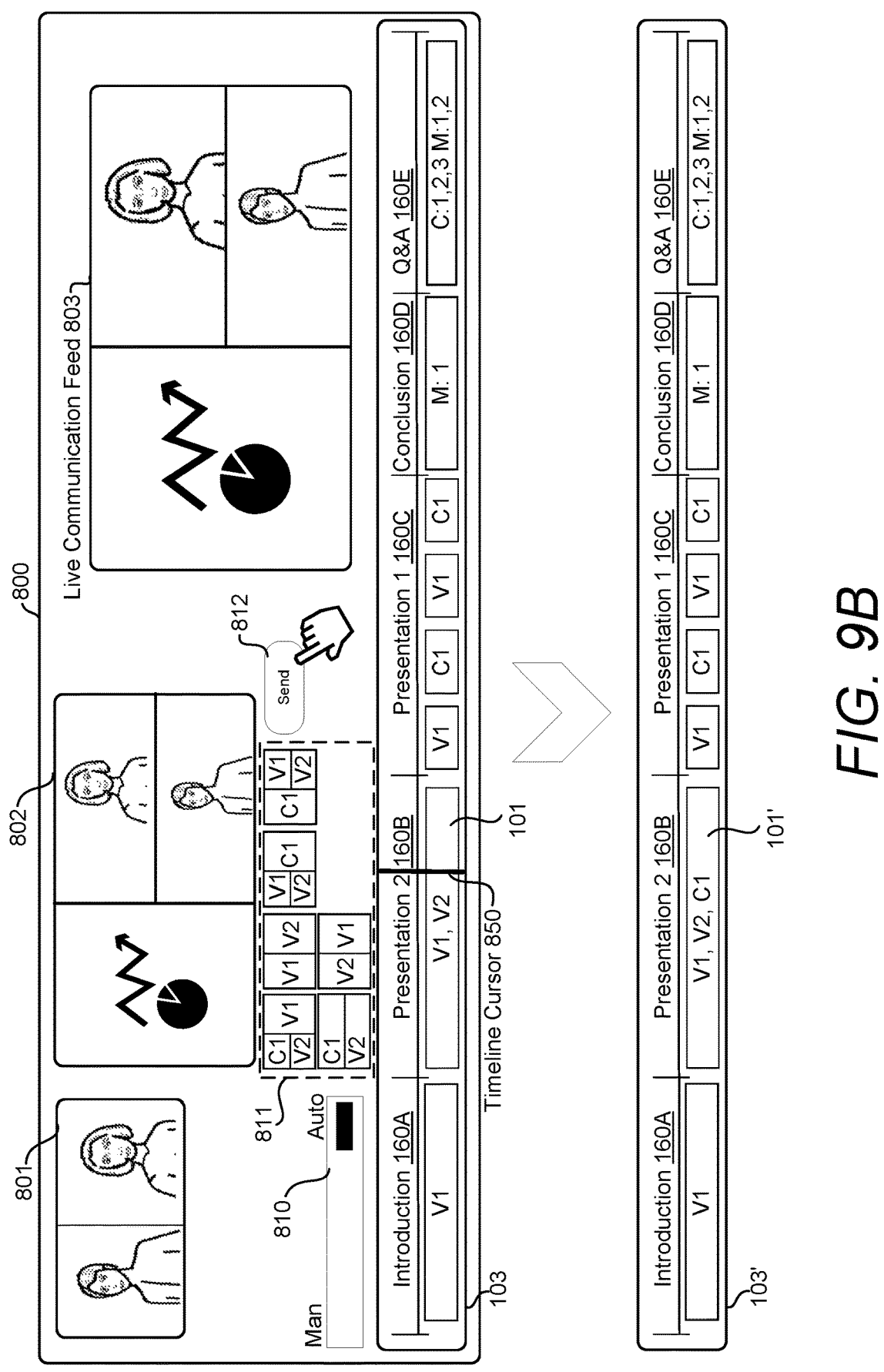
FIG. 9B illustrates modifications to a sequence event that are manually applied to a timeline based on monitored activity.

The techniques disclosed in FIGS. 8A-8C herein can involve any type of modification to a sequence event, e.g., a modification to a timeline or a live communication feed. As described above, raw video feeds can be scaled, mirrored, aligned, or otherwise processed to improve the viewability of any displayed content. In addition, special effects, such as dimming, shading, or sharpening, can be applied to improve the viewability of any displayed content. In addition, contextual data associated with an event can be analyzed to determine one or more modifications that can be made to a sequence event. FIG. 9A and FIG. 9B illustrate additional examples of modifications that can be made to a sequence event based on the analysis of contextual data of an event.

In the example of FIG. 9A, consider a scenario where the system 100 analyzes the audio streams of the participants in a meeting. The system can be configured to identify keywords, specific languages, and references to specific objects. In this example, the system is configured to identify a particular language. Thus, if the meeting is generally conducted in a first language, e.g., English, and one of the participants starts to speak in a second language, the system can detect this activity and automatically recommend a display of a translation of the speech into the second language. As shown in FIG. 9A, the preview display area 802 includes a graphical element 901 suggesting a translation. Based on the operating mode, the system 100 can automatically display the translation within the live feed 803, or the translation can be displayed in response to a user input, such as a user input received at control mechanism 812. The example of FIG. 9A also shows that modifications can be done at one time. In this example, the image of User 1 is also scaled, repositioned, and mirrored to present the rendering of User 1 in a format that can enhance user engagement.

In another illustrative embodiment, when the system detects a low volume from a microphone, the system may automatically display closed captioning text. Similarly, based on the hardware data, if the system detects that the volume of a presentation is below a threshold at a client device of an audience member, the system may automatically display closed captioning text to one or more audience members.

In the example of FIG. 9B, the system analyzes the audio streams of the participants in a meeting. The system is configured to identify phrases and references to specific content. In this example, one of the participants makes a reference to a particular slide in a file. In response to the identification of this content, the system retrieves the content and displays the identified slide with the video feeds of the participants in the preview display area 802. In response to a user input, such as the activation of the control mechanism 812, the system modifies the live communication feed 803. In addition, the system modifies the sequence event 101 of the timeline 103. Specifically, the sequence event 101 defining a UI layout having a display of two video streams (V1 and V2) is used to generate a modified sequence event 101' of an updated timeline 103', where the modified sequence event 101' defines a user interface layout having a display of two video streams (V1 and V2) along with a display of the identified content (C1).

These examples are provided for illustrative purposes and are not to be construed as limiting. It can be appreciated that other effects and modifications can be applied to video data and content to enhance user engagement. For instance, other types of data can be displayed and/or modified in response to one or more user actions or detected conditions.

Figure 10:
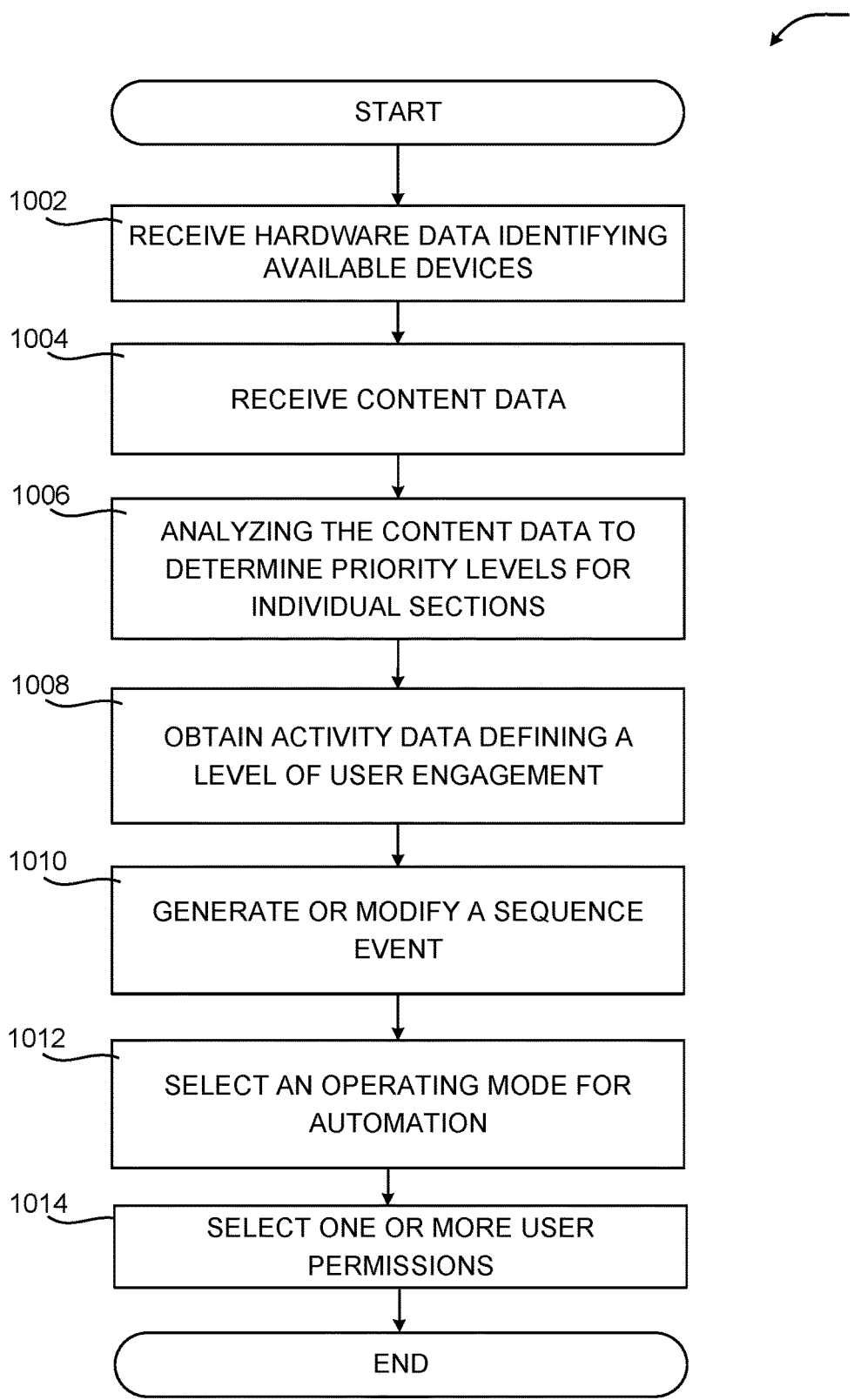
FIG. 10 is a flow diagram illustrating aspects of a sample routine for implementing the techniques disclosed herein.

FIG. 10 is a diagram illustrating aspects of a routine 1000 for computationally efficient management of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example presentation user interface(s) (UI) described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 1000 begins at operation 1002, where the computing device receives hardware data identifying available devices. As described herein, the hardware data can include any description of equipment that is available for a particular communication session. For instance, cameras, microphones, speakers, lights, or any type of sensor available to a computing system facilitating a communication session can be described in the hardware data. The hardware data can also include descriptions of the capabilities of each device. The capabilities can be utilized by a computer to establish limits to the parameters. For instance, a microphone may have a range of sensitivity and parameters selected for a sequence event that can be controlled by that range of sensitivity.

The routine 1000 then proceeds to operation 1004, where the computing device receives content data. The content data can be in any format, such as but not limited to a slide deck, a word processing document, or any other data including a video, an image, or audio data. In some configurations, content data can comprise a plurality of sections. The sections can be defined by any type of indicator, e.g., sections can be defined by page breaks, formatting changes, content type, etc.

At operation 1006, the computing device analyzes the content data to determine priority levels for individual sections. For instance, a document comprising a speech can be analyzed to determine the priority level for individual sections, such as an introduction section, a presentation section, or a conclusion section. Priority levels can also be determined for individual paragraphs, sentences, phrases, or words. As described herein, a priority level allows a computing device to take one more actions to modify or generate a sequence event when a priority level of a section reaches a threshold level.

Next, at operation 1008, the computing device can obtain activity data defining a level of user engagement. In some embodiments, the activity data can be generated by the computing device. For example, the computing device can track a user's eye gaze direction and determine a level of engagement based on a pattern of movement, a particular gesture such as a user closing their eyes. In one example, the computing device can determine when audience members are taking notes. Such actions can be captured by the use of a video camera directed to users or by the use of input sensors monitoring the activities of one or more users.

In some embodiments, the activity data can be received by the computing device from a remote computing device analyzing video data and/or audio data to determine when users are performing a particular gesture. The remote computing device can detect a threshold level of user engagement and communicate that to a computing device managing a communication session.

Next, at operation 1010, the computing device can generate or modify a sequence event. A sequence event can be configured to accommodate a particular hardware device that is available to a communication session. An individual sequence event can include parameters for controlling a particular hardware device. For instance, a sequence event can define zoom levels, volume levels, or other parameters for lights, microphones, cameras, sensors, etc. A sequence event can also define types of content to be displayed, user interface layouts, or any other visual arrangement of a communication session.

At operation 1012, the computing device can determine an operating mode for the automation of the modified or generated sequence events. In some embodiments, the system can operate in a manual mode. In manual mode, user interaction is required to apply a modified or generated sequence event to a timeline or a live feed to a communication session. The system can also operate in an automatic mode that does not require user interaction to apply a modified or generated sequence event to a timeline or a live feed of a communication session. The system can also operate in a semi-manual or semiautomatic mode, where the system can automatically apply certain types of sequence events to a timeline or a live feed of a communication session, yet require user interaction, e.g., a user input or gesture to approve, the application of a particular sequence event to a timeline or a live feed of a communication session.

In some embodiments, the computing device can determine a curation score based on one or more values associated with at least one of a number of participants in an event, a number of invitees, a number of invitees that have accepted an invitation, a number of invitees that have declined an invitation, a number of presenters, or a number of audience members. Any combination of these values can be used to determine a curation score. In addition, each value can be weighted based on a priority of each value.

A generated or modified sequence event, which can include an adjusted parameter for a sequence event or a timeline, can be automatically applied to a timeline or live feed in response to determining that the curation score is within a first range.

A generated or modified sequence event, which can include an adjusted parameter for a sequence event or a timeline, can be displayed as a graphical representation of a suggestion, in response to determining that the curation score is within a second range. Alternatively, a generated sequence event, modified sequence event, or an adjusted parameter can be automatically applied to a timeline or a live feed, in response to determining that the curation score is outside the first range and the second range, and if the generated sequence event, modified sequence event, or the adjusted parameter is associated with a predetermined category of modifications.

At operation 1014, the computing device selects one or more user permissions, after which the routine ends. As summarized above, the user permissions can be based on one or more factors relating to a communication session. For instance, user permissions can be based on a size of an event, e.g., a number of participants of a communication session, or a number of participants having a particular status, e.g., attendees versus presenters.

For instance, the computing device can establish permissions for editing the content data to a category of participants, in response to determining that an attribute of participants of the communication session satisfies one or more criteria. The one or more criteria can define at least one of a threshold number of participants in the communication session, a threshold number of invitees, a threshold number of invitees that have accepted an invitation, or a threshold number of presenters. A category of participants can also be defined by a role, title, or status of the participants. For instance, a CEO of a company may have a first level of access to content or devices of a communication session, while managers may have a second level of access to content or devices, while other employees have a third level of access to content or devices, etc. Thus, the computing device can establish or generate permissions for accessing the content data to a category of participants, in response to determining that participants of the communication session meet or do not meet one or more criteria.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
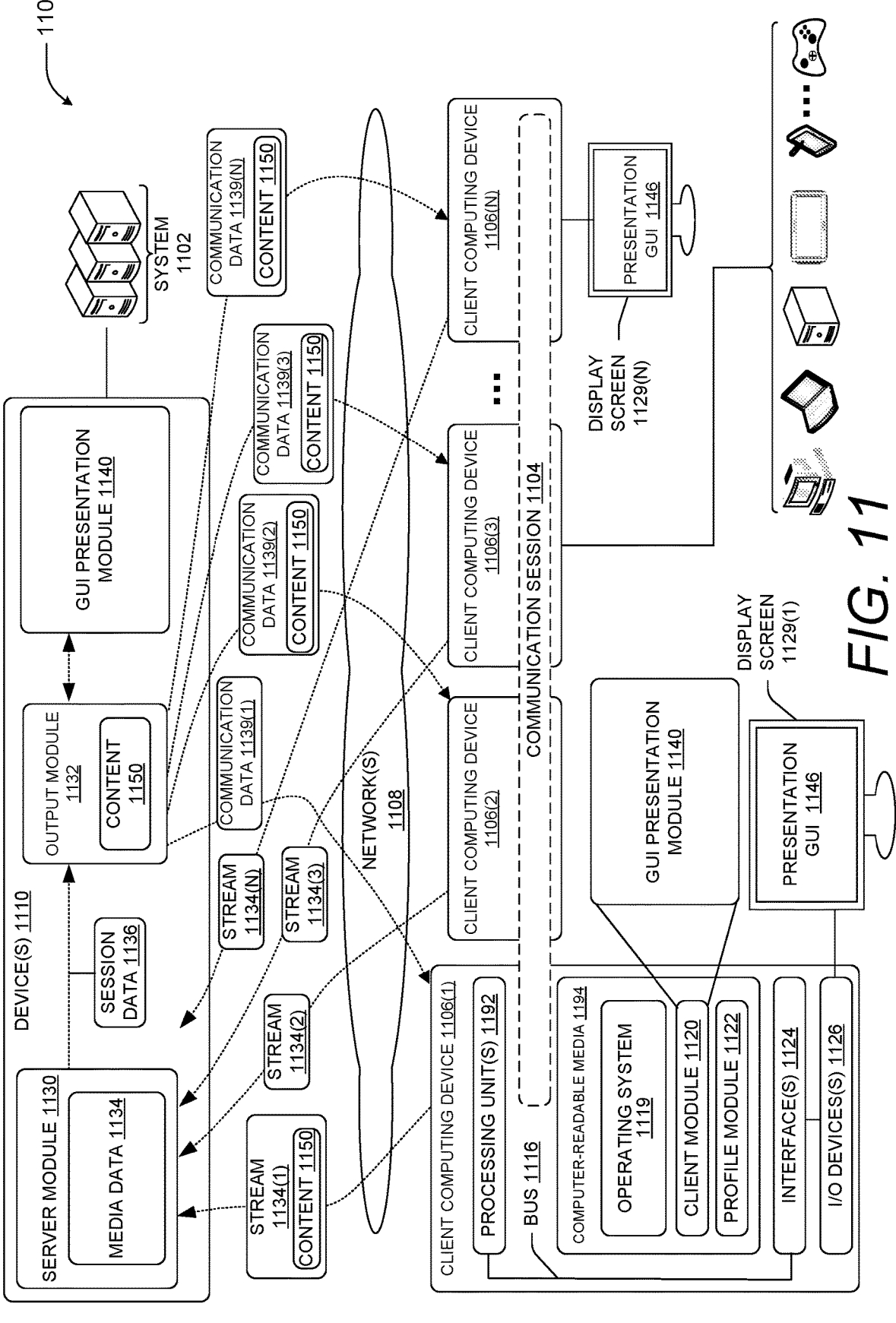
FIG. 11 is a computing system diagram showing aspects of an illustrative operating environment for the techniques disclosed herein.

FIG. 11 is a diagram illustrating an example environment 1100 in which a system 1102 (which can be system 100 of FIG. 1) can implement the techniques disclosed herein. In some implementations, a system 1102 may function to collect, analyze, and share data defining one or more objects that are displayed to users of a communication session 1104.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent configured to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that captures the appearance and speech of a user participating in the communication session). In some implementations, the video feeds may comprise such audio and visual data, one or more still images, and/or one or more avatars. The one or more still images may also comprise one or more avatars.

Another example of an individual stream of live and/or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live and/or recorded content within the communication data enable a remote meeting to be facilitated between a group of people and the sharing of content within the group of people. In some implementations, the various streams of live and/or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee of a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(N) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, images, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, images, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
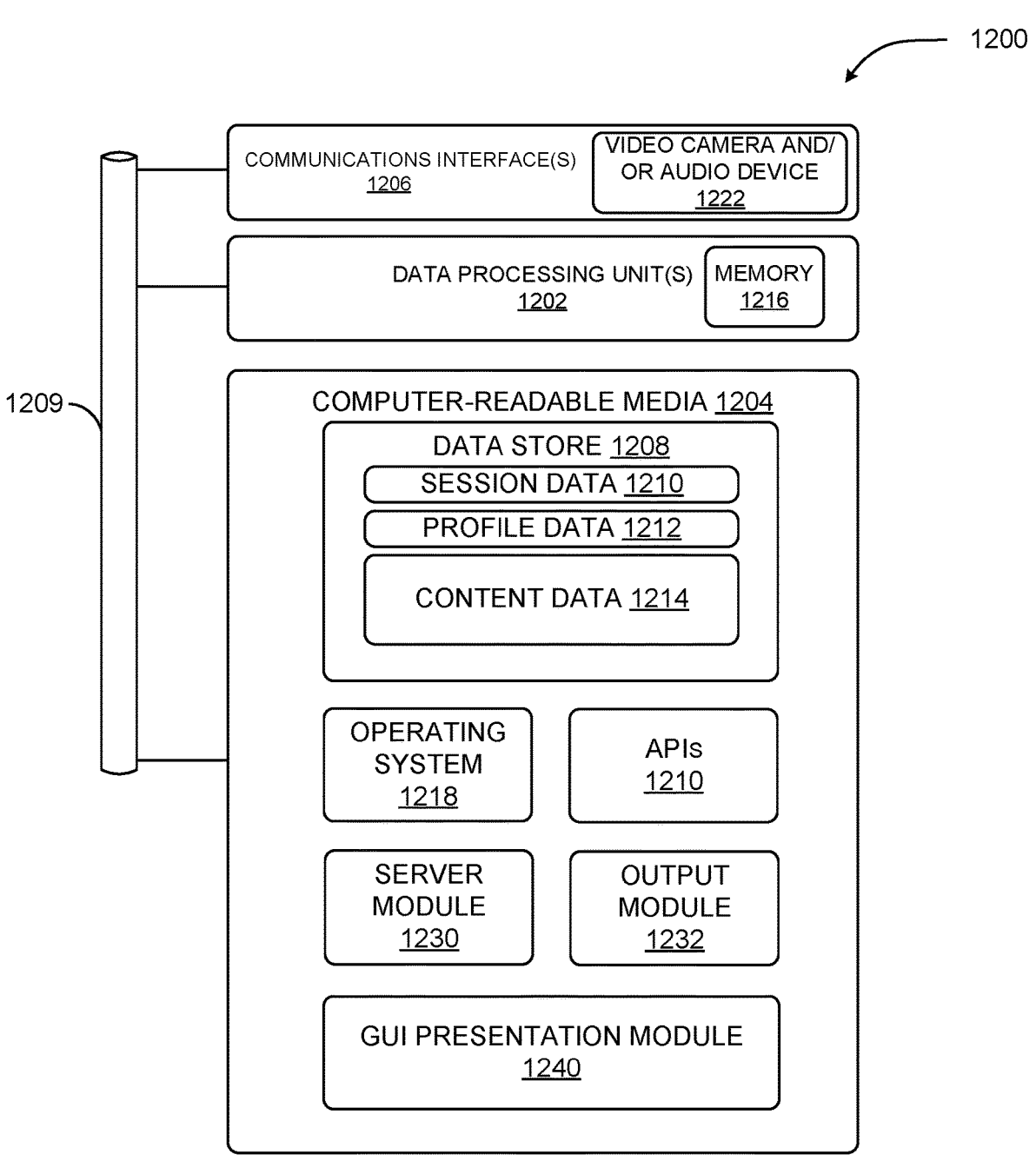
FIG. 12 is a computing architecture diagram showing aspects of the configuration and operation of a computing device that can implement aspects of the techniques disclosed herein.

FIG. 12 illustrates a diagram that shows example components of an example device 1200 (also referred to herein as a "computing device") configured to generate and process data for some of the user interfaces disclosed herein. The device 1200 may generate data that may include one or more sections that may render or comprise video, images, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of digital signal processors ("DSPs"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210, profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for reconfiguring incoming streams from a plurality of video streams to achieve visual consistency for a plurality of participants of a communication session, comprising:

analyzing a plurality of renderings depicting the plurality of participants of the communication session to detect one or more discrepancies between a first rendering depicting a first participant and a second rendering depicting a second participant of the communication session, wherein the analysis of the plurality of renderings for detecting the one or more discrepancies comprises, analyzing a raw data feed from of the plurality of video streams to determine an eye gaze direction that is depicted in the first rendering of the first participant, and determining that the eye gaze direction of the first participant that is depicted in the first rendering is not directed toward a position of the second rendering of the second participant;

in response to determining that the eye gaze direction of the first participant is not directed toward the position of the second rendering of the second participant, selectively generating communication data for causing one or more computing devices of the plurality of participants to display one or more user interfaces comprising the first rendering depicting the first participant and a corrected orientation of the first participant depicted in the first rendering, wherein the corrected orientation directs the eye gaze direction of the first participant toward the of the position of the second rendering of the second participant; and causing a transmission of the communication data to the one or more computing devices of the plurality of participants of the communication session, the communication data causing the one or more computing devices to concurrently display the one or more user interfaces comprising the first rendering depicting the first participant having the adjusted eye gaze direction that is directed toward the position of the second rendering of the second participant.

2. The method of claim 1, further comprising adjusting a display property of the first rendering, wherein the display property comprises a size of the first rendering of the first participant of the communication session, wherein the discrepancy with the one or more display properties comprises a size that is different from the second rendering of the second participant of the communication session, wherein the scale of the first rendering of the first participant having the adjusted display property is corrected to align at least one physical feature of the first participant depicted in the first rendering with at least one physical feature of the second participant depicted in the second rendering of the communication session.

3. The method of claim 2, wherein adjusting a display property comprises adjusting one or more hardware parameters including at least one of a zoom level of a camera capturing an image of the first participant of the communication session, wherein the adjusted display property comprises adjusting the zoom level of the camera to align a size of the first rendering of the first participant with a size of the second rendering of the second participant.

4. The method of claim 1, further comprising adjusting a display property of the first rendering, wherein the display property comprises an intensity level of a light applied to the first rendering of the first participant of the communication session, wherein the intensity level of the light is adjusted to match a light level of the second rendering.

5. The method of claim 4, wherein adjusting the display property further comprises adjusting one or more hardware parameters, wherein the hardware parameters are adjusted based on at least one of a user preference, user activity, and an analysis of the communication data.

6. A system for reconfiguring incoming streams from a plurality of video streams to achieve visual consistency for a plurality of participants of a communication session, comprising:

one or more data processing units; and a computer-readable medium having encoded thereon computer-executable instructions to cause one or more data processing units to:

analyze a plurality of renderings depicting the plurality of participants of the communication session to detect one or more discrepancies between a first rendering depicting a first participant and a second rendering depicting a second participant of the communication session, wherein the analysis of the plurality of renderings for detecting the one or more discrepancies comprises, analyzing a raw data feed from of the plurality of video streams to determine an eye gaze direction that is depicted in the first rendering of the first participant, and determining that the eye gaze direction of the first participant that is depicted in the first rendering is not directed toward a position of the second rendering of the second participant;

in response to determining that the eye gaze direction of the first participant is not directed toward the position of the second rendering of the second participant, selectively generate communication data for causing one or more computing devices of the plurality of participants to display one or more user interfaces comprising the first rendering depicting the first participant and a corrected orientation of the first participant depicted in the first rendering, wherein the corrected orientation directs the eye gaze direction of the first participant toward the of the position of the second rendering of the second participant; and cause a transmission of the communication data to the one or more computing devices of the plurality of participants of the communication session, the communication data causing the one or more computing devices to concurrently display the one or more user interfaces comprising the first rendering depicting the first participant having the adjusted eye gaze direction that is directed toward the position of the second rendering of the second participant.

7. The system of claim 6, wherein the instructions further cause the one or more data processing units to adjust a display property of the first rendering, wherein the display property comprises a size of the first rendering of the first participant of the communication session, wherein the discrepancy with the one or more display properties comprises a size that is different from the second rendering of the second participant of the communication session, wherein the scale of the first rendering of the first participant having the adjusted display property is corrected to align at least one physical feature of the first participant depicted in the first rendering with at least one physical feature of the second participant depicted in the second rendering of the communication session.

8. The system of claim 7, wherein adjusting a display property comprises adjusting one or more hardware parameters including at least one of a zoom level of a camera capturing an image of the first participant of the communication session, wherein the adjusted display property comprises adjusting the zoom level of the camera to align a size of the first rendering of the first participant with a size of the second rendering of the second participant.

9. The system of claim 6, wherein the instructions further cause the one or more data processing units to adjust a display property of the first rendering, wherein the display property comprises an intensity level of a light applied to the first rendering of the first participant of the communication session, wherein the intensity level of the light is adjusted to match a light level of the second rendering.

10. The system of claim 9, wherein adjusting the display property further comprises adjusting one or more hardware parameters, wherein the hardware parameters are adjusted based on at least one of a user preference, user activity, and an analysis of the communication data.

11. A computer storage device having computer-executable instructions stored thereon cause a system to reconfigure incoming streams from a plurality of video streams to achieve visual consistency for a plurality of participants of a communication session, the computer-executable instructions to cause one or more data processing units of the system to:

analyze a plurality of renderings depicting the plurality of participants of the communication session to detect one or more discrepancies between a first rendering depicting a first participant and a second rendering depicting a second participant of the communication session, wherein the analysis of the plurality of renderings for detecting the one or more discrepancies comprises, analyzing a raw data feed from of the plurality of video streams to determine an eye gaze direction that is depicted in the first rendering of the first participant, and determining that the eye gaze direction of the first participant that is depicted in the first rendering is not directed toward a position of the second rendering of the second participant;

in response to determining that the eye gaze direction of the first participant is not directed toward the position of the second rendering of the second participant, selectively generate communication data for causing one or more computing devices of the plurality of participants to display one or more user interfaces comprising the first rendering depicting the first participant and a corrected orientation of the first participant depicted in the first rendering, wherein the corrected orientation directs the eye gaze direction of the first participant toward the of the position of the second rendering of the second participant; and cause a transmission of the communication data to the one or more computing devices of the plurality of participants of the communication session, the communication data causing the one or more computing devices to concurrently display the one or more user interfaces comprising the first rendering depicting the first participant having the adjusted eye gaze direction that is directed toward the position of the second rendering of the second participant.

12. The computer storage device of claim 11, wherein the instructions further cause the one or more data processing units to adjust a display property of the first rendering, wherein the display property comprises a size of the first rendering of the first participant of the communication session, wherein the discrepancy with the one or more display properties comprises a size that is different from the second rendering of the second participant of the communication session, wherein the scale of the first rendering of the first participant having the adjusted display property is corrected to align at least one physical feature of the first participant depicted in the first rendering with at least one physical feature of the second participant depicted in the second rendering of the communication session.

13. The computer storage device of claim 12, wherein adjusting a display property comprises adjusting one or more hardware parameters including at least one of a zoom level of a camera capturing an image of the first participant of the communication session, wherein the adjusted display property comprises adjusting the zoom level of the camera to align a size of the first rendering of the first participant with a size of the second rendering of the second participant.

14. The computer storage device of claim 11, wherein the instructions further cause the one or more data processing units to adjust a display property of the first rendering, wherein the display property comprises an intensity level of a light applied to the first rendering of the first participant of the communication session, wherein the intensity level of the light is adjusted to match a light level of the second rendering.

15. The computer storage device of claim 14, wherein adjusting the display property further comprises adjusting one or more hardware parameters, wherein the hardware parameters are adjusted based on at least one of a user preference, user activity, and an analysis of the communication data.

* * * * *